(12) United States Patent
Liu

(10) Patent No.: US 12,235,762 B1
(45) Date of Patent: Feb. 25, 2025

(54) DATA ACCESS METHOD AND APPARATUS, DEVICE, AND NON-TRANSITORY READABLE STORAGE MEDIUM

(71) Applicant: IEIT SYSTEMS CO., LTD., Shandong (CN)

(72) Inventor: Ke Liu, Shandong (CN)

(73) Assignee: IEIT SYSTEMS CO., LTD., Shandong (CN)

( * ) Notice: Subject to any disclaimer, the term of this patent is extended or adjusted under 35 U.S.C. 154(b) by 0 days.

(21) Appl. No.: 18/724,508

(22) PCT Filed: Dec. 27, 2022

(86) PCT No.: PCT/CN2022/142526
§ 371 (c)(1),
(2) Date: Jun. 26, 2024

(87) PCT Pub. No.: WO2024/051041
PCT Pub. Date: Mar. 14, 2024

(30) Foreign Application Priority Data

Sep. 6, 2022 (CN) .......................... 202211081605.9

(51) Int. Cl.
*G06F 12/08* (2016.01)
*G06F 12/0802* (2016.01)

(52) U.S. Cl.
CPC ............................... *G06F 12/0802* (2013.01)

(58) Field of Classification Search
CPC .................................................. G06F 12/0802
(Continued)

(56) References Cited

U.S. PATENT DOCUMENTS

| 8,204,871 | B1 | 6/2012 | Pawar et al. |
| 2002/0138699 | A1 | 9/2002 | Okamura |

(Continued)

FOREIGN PATENT DOCUMENTS

| CN | 101968791 A | 2/2011 |
| CN | 104615576 A | 5/2015 |

(Continued)

OTHER PUBLICATIONS

Corresponding International Patent Application No. PCT/CN2022/142526, International Search Report, Date Mailed Mar. 26, 2024.
(Continued)

*Primary Examiner* — Jae U Yu
(74) *Attorney, Agent, or Firm* — Cooper Legal Group, LLC

(57) ABSTRACT

Disclosed are a data access method and apparatus, a device, and a computer-readable storage medium, the method including: creating a cache pool matching memory capacity of an accelerator card on a host side, the cache pool containing cache blocks divided according to a set capacity unit; under a condition that acquiring a read instruction of target data, calling from the cache pool a target cache block matching capacity of the target data; storing the target data into the target cache block, recording meta information about the target cache block, and setting write protection for the target cache block; and executing a data access operation according to state information corresponding to the cache blocks, and adjusting the state information about the cache blocks after executing the data access operation.

20 Claims, 17 Drawing Sheets

(58) Field of Classification Search
USPC .......................................................... 711/118
See application file for complete search history.

(56) References Cited

U.S. PATENT DOCUMENTS

| | | | |
|---|---|---|---|
| 2006/0059317 A1* | 3/2006 | Kakeda | G06F 12/0833 |
| | | | 711/144 |
| 2010/0100680 A1 | 4/2010 | Koseki | |
| 2019/0227951 A1 | 7/2019 | Durham et al. | |
| 2021/0117333 A1 | 4/2021 | Qureshi et al. | |

FOREIGN PATENT DOCUMENTS

| | | | |
|---|---|---|---|
| CN | 106844248 A | 6/2017 | |
| CN | 110196818 A | 9/2019 | |
| CN | 110764708 A | 2/2020 | |
| CN | 112559165 A | 3/2021 | |
| CN | 113343045 A | 9/2021 | |
| CN | 114428589 A | 5/2022 | |
| CN | 114945009 A | 8/2022 | |
| CN | 115168259 A | 10/2022 | |
| JP | 2013073644 A | 4/2013 | |

OTHER PUBLICATIONS

Corresponding International Patent Application No. PCT/CN2022/142526, Written Opinion, Date Mailed Mar. 11, 2023.
Corresponding Chinese Patent Application No. CN202211081605.9, Office Action date mailed Oct. 19, 2022.
Corresponding Chinese Patent Application No. CN202211081605.9, Notice of Patent Grant date mailed Oct. 30, 2022.
Ling Zhan, et al., "Design and Implementation of Cache Algorithm for Multimedia Network File System", Journal of Chinese Computer Systems, Sep. 30, 2009, vol. 30, No. 9, pp. 1873-1876.
G. D. Kesavan et al., "Comparative Study on Data Compression Techniques in Cache to Promote Performance", 2019 IEEE International Conference on Intelligent Techniques in Control, Optimization and Signal Processing (INCOS), Apr. 13, 2019, pp. 1-6.

* cited by examiner

DATA ACCESS METHOD AND APPARATUS, DEVICE, AND NON-TRANSITORY READABLE STORAGE MEDIUM

CROSS-REFERENCE TO RELATED APPLICATION

This application claims priority to Chinese Patent Application No. 202211081605.9, filed on Sep. 6, 2022 in China National Intellectual Property Administration and entitled "Data Access Method and Apparatus, Device, and Computer-Readable Storage Medium", which is hereby incorporated by reference in its entirety.

FIELD

The present application relates to the technical field of computers, and in particular to a data access method and apparatus, a device, and a non-transitory readable storage medium.

BACKGROUND

A file system is configured to manage data blocks on a disk. After the disk is formatted, the file system writes and reads data in a fixed format. Since an access bandwidth of memory is much greater than that of the disk, according to a locality principle of a central processing unit (CPU/processor) accessing data, the file system caches disk data blocks recently accessed by the CPU in memory, referred to as file cache. In response to a determination that the CPU accesses the file block in a same location again, the data in the file cache is directly returned to the CPU from the file cache instead of being read from the disk, thereby improving overall performance of the system.

With development of artificial intelligence and big data, a model that relies on CPU for computing under a traditional architecture is difficult to meet needs of new businesses for computer computing power. To solve a problem of insufficient computing power under the traditional architecture, accelerator cards such as a graphics processing unit (GPU), a field-programmable gate array (FPGA), and an application-specific integrated circuit (ASCI) are widely used in an industry in recent years, to improve the overall performance of the system through heterogeneous computing.

FIG. 1 is a structural diagram of a heterogeneous computing platform provided in the prior art. In the heterogeneous computing, the data is read from the disk to the file cache and then transmitted to the accelerator card for calculation, and finally the calculated result is read from the accelerator card to a system memory. Since computing power of the accelerator card for certain data far exceeds that of the CPU, the overall performance of the system may be significantly improved through the heterogeneous computing.

However, the heterogeneous computing requires transmitting data from the file cache to the accelerator card and then reading the calculated data from the accelerator card, which introduces overhead of data movement back and forth, thereby reducing performance benefits obtained from using the heterogeneous computing. In the traditional file system cache, memory is managed in 4 KB-sized pages, and files are divided into a plurality of 4 KB-sized data blocks before being cached. Before the transmission of the direct memory access (DMA), it is necessary to lock the memory by traversing all pages one by one in 4 KB units, which takes a long time. While one descriptor may describe the size of 4 KB, and the accelerator card may acquire 4 KB of data at a time, which limits the transmission bandwidth of DMA. Since the data blocks are randomly distributed in memory in a discontinuous manner, it is necessary to construct a DMA descriptor for each page in 4 K units; excessive descriptor creation results in a long time.

Aiming at the problem of low transmission efficiency of DMA caused by small and discontinuous cache blocks, a method of pre-applying for a continuous large block memory is proposed. FIG. 2 is a structural diagram of a continuous memory-based heterogeneous computing platform provided in the prior art. The operation process for a file page includes: (1) Data read from the disk by the host side is cached in the file cache of an operating system. (2) CPU copies data blocks from the file cache into continuous anonymous pages. (3) The data is transmitted from the anonymous pages to the accelerator card. Since anonymous pages are continuous large block memories, the DMA descriptors are constructed fast, and the accelerator card acquires a large block memory at a time, which increases the DMA bandwidth accordingly. (4) After the accelerator card calculation is completed, the host side acquires the calculation results from the accelerator card. It is found that although step (3) uses continuous memory, which greatly improves the efficiency of DMA data transmission, the copy operation in step (2) still introduces a large delay.

The method of pre-applying for the continuous large block memory reduces DMA descriptor creation time and increases the DMA bandwidth of the accelerator card. However, this implementation is applicable to the scenario of anonymous pages, and there is copy overhead for file pages, which affects the overall performance. In addition, in the current file system cache management mechanism, data in the accelerator card is not managed. Since the data in the accelerator card does not have a corresponding relationship with the file, even if the accelerator card has cached the file data block in a last calculation, the file data needed in a next calculation still needs to be transmitted from the host side to the accelerator card, resulting in repeated transmission and wasting a large amount of transmission bandwidth.

It may be seen that it is a problem to be solved by the skilled in the art to improve bandwidth utilization and reduce data transmission delay.

SUMMARY

An object of embodiments of the present application is to provide a data access method and apparatus, a device, and a non-transitory readable storage medium, which may improve bandwidth utilization and reduce data transmission delay.

To solve the above technical problem, the embodiments of the present application provide a data access method, including: creating a cache pool matching memory capacity of an accelerator card on a host side, the cache pool including cache blocks divided according to a set capacity unit; calling, under a condition that acquiring a read instruction of target data, a target cache block matching capacity of the target data from the cache pool, and storing the target data into the target cache block; recording meta information about the target cache block, and setting write protection for the target cache block, where the meta information includes a file number to which the target data belongs, a length of the target data, address information about the target data, and state information for characterizing data synchronization state of the target cache block and the accelerator card; and executing a data access operation according to state information corresponding to the cache blocks, and adjusting the state information about the cache blocks after executing the data access operation, where the state information includes an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

In some embodiments, after the creating a cache pool matching memory capacity of an accelerator card on a host side, the method further includes: creating an idle linked list and a cache linked list, where the idle linked list is configured to store unused cache blocks, and the cache linked list is configured to store used cache blocks; and accordingly, the calling, under a condition that acquiring a read instruction of target data, a target cache block matching capacity of the target data from the cache pool, and storing the target data into the target cache block includes: selecting, under a condition that acquiring the read instruction of the target data, the target cache block matching the capacity of the target data from the idle linked list and the cache linked list, and storing the target data into the target cache block, where the target cache block is stored in the cache linked list.

In some embodiments, the selecting the target cache block matching the capacity of the target data from the idle linked list and the cache linked list, and storing the target data into the target cache block includes: storing one idle cache block in the idle linked list into the cache linked list under a condition that the idle linked list is not empty; reading, under a condition that there is a page fault in accessing the target data, a first data block matching a set capacity unit from a disk, and storing the first data block into the idle cache block; establishing a mapping relationship between a physical address and a virtual address of the first data block; or releasing, under a condition that the idle linked list is empty, an available cache block from the cache linked list, and reading, under a condition that there is the page fault in accessing the target data, a second data block matching the set capacity unit from the disk, and storing the second data block to the available cache block; establishing a mapping relationship between a physical address and a virtual address of the second data block; and ending operation until all data blocks divided by the target data are stored in the target cache block.

In some embodiments, the releasing an available cache block from the cache linked list includes: selecting the available cache block from the cache linked list according to a replacement algorithm of the cache linked list; and writing original data in the available cache block back to the disk.

In some embodiments, the recording meta information about the target cache block includes: recording the file number of the target data, the length of the target data, an offset of the target data in a file, a source address for indicating the target cache block where the target data is located, a destination address of an accelerator card corresponding to the source address, and the state information for characterizing the data synchronization state of the target cache block and the accelerator card.

In some embodiments, the adjusting the state information about the cache blocks after executing the data access operation includes: adjusting, after the target data is transmitted to the accelerator card, the state information as an identifier for characterizing that both the accelerator card and the target cache block store data and the data is consistent.

In some embodiments, the executing a data access operation according to state information corresponding to the cache blocks, and adjusting the state information about the cache blocks after executing the data access operation includes: modifying, under a condition that receiving a target data modification instruction, the target data stored in the target cache block, and adjusting the state information as an identifier for characterizing that both the accelerator card and the target cache block store data and the data is inconsistent.

In some embodiments, after the creating a cache pool matching memory capacity of an accelerator card on a host side, the method further includes: performing memory locking on the cache blocks of the cache pool.

In some embodiments, after the creating a cache pool matching memory capacity of an accelerator card on a host side, the method further includes: determining, under a condition that receiving an acceleration processing instruction of first data, whether the first data is cached by the cache pool; loading, under a condition that the first data is not cached by the cache pool, the first data from a disk into the cache pool; adding the first data in the cache pool to a DMA transmission linked list; generating a DMA descriptor according to meta information corresponding to a cache block storing the first data; and transmitting the DMA descriptor to the accelerator card, whereby the accelerator card acquires the first data contained in the DMA transmission linked list according to the DMA descriptor.

In some embodiments, the determining, under a condition that receiving an acceleration processing instruction of first data, whether the first data is cached by the cache pool includes: constructing, under a condition that receiving the acceleration processing instruction of the first data, a file information linked list according to a file number and data volume of the first data; dividing the first data into file blocks according to the set capacity unit; traversing the file block of the file information linked list, and determining whether a current file information linked list is empty; determining, under a condition that the current file information linked list is not empty, whether the current file block is cached by the cache pool; and accordingly, the loading, under a condition that the first data is not cached by the cache pool, the first data from a disk into the cache pool; adding the first data in the cache pool to a DMA transmission linked list includes: loading, under a condition that the current file block is not cached by the cache pool, the current file block from the disk into the cache pool; adding the current file block in the cache pool to the DMA transmission linked list; and executing a step of the generating a DMA descriptor according to meta information corresponding to a cache block storing the first data, until the current file information linked list is empty.

In some embodiments, the method further includes: determining, under a condition that the current file block is cached by the cache pool, whether state information corresponding to the current cache block caching the current file block is the identifier for characterizing that both the accelerator card and the current cache block store data and the data is consistent; adding, under a condition that the state information corresponding to the current cache block is an identifier for characterizing that both the accelerator card and the current cache block store data and the data is inconsistent, the current file block in the cache pool to the DMA transmission linked list; and skipping the current file block under a condition that the state information corresponding to the current cache block is the identifier for characterizing that both the accelerator card and the current cache block store data and the data is consistent.

In some embodiments, after the transmitting the DMA descriptor to the accelerator card, whereby the accelerator card acquires the first data contained in the DMA transmission linked list according to the DMA descriptor, the method further includes: adjusting state information corresponding to the first data in the cache pool as an identifier for characterizing that both the accelerator card and the cache pool store data and the data is consistent; and setting write protection for the cache block where the first data is located.

The embodiment of the present application further provides a data access apparatus, including a creation unit, a storage unit, a recording unit, a write protection setting unit, and an adjustment unit, where the creation unit is configured to create a cache pool matching memory capacity of an accelerator card on a host side, the cache pool including cache blocks divided according to a set capacity unit; the storage unit is configured to call, under a condition that acquiring a read instruction of target data, a target cache block matching capacity of the target data from the cache pool, and store the target data into the target cache block; the recording unit is configured to record meta information about the target cache block, where the meta information includes a file number to which the target data belongs, a length of the target data, address information about the target data, and state information for characterizing data synchronization state of the target cache block and the accelerator card; the write protection setting unit is configured to set write protection for the target cache block; and the adjustment unit is configured to execute a data access operation according to state information corresponding to the cache blocks, and adjust the state information about the cache blocks after executing the data access operation, where the state information includes an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

In some embodiments, the apparatus further includes a linked list creation unit; the linked list creation unit is configured to create an idle linked list and a cache linked list, where the idle linked list is configured to store unused cache blocks, and the cache linked list is configured to store used cache blocks; accordingly, the storage unit is configured to select, under a condition that acquiring the read instruction of the target data, the target cache block matching the capacity of the target data from the idle linked list and the cache linked list, and store the target data into the target cache block, where the target cache block is stored in the cache linked list.

In some embodiments, the storage unit includes a store subunit, a first reading subunit, a first storage subunit, a first establishment subunit, a release subunit, a second reading subunit, a second storage subunit, and a second establishment subunit; the store subunit is configured to store one idle cache block in the idle linked list into the cache linked list under a condition that the idle linked list is not empty; the first reading subunit is configured to read, under a condition that there is a page fault in accessing the target data, a first data block matching the set capacity unit from a disk; the first storage subunit is configured to store the first data block into the idle cache block; the first establishment subunit is configured to establish a mapping relationship between a physical address and a virtual address of the first data block; the releasing subunit is configured to release, under a condition that the idle linked list is empty, an available cache block from the cache linked list; the second reading subunit is configured to read, under a condition that there is the page fault in accessing the target data, a second data block matching the set capacity unit from the disk; the second storage subunit is configured to store the second data block to the available cache block; the second establishment subunit is configured to establish a mapping relationship between a physical address and a virtual address of the second data block, and until all the data blocks divided by the target data are stored in the target cache block, end the operation.

In some embodiments, from the release subunit, an available cache block is selected from the cache linked list according to a replacement algorithm of the cache linked list; and original data in the available cache block is written back to the disk.

In some embodiments, the recording unit is configured to record the file number of the target data, the length of the target data, an offset of the target data in the file, a source address for indicating the target cache block where the target data is located, a destination address of the accelerator card corresponding to the source address, and the state information for characterizing the data synchronization state of the target cache block and the accelerator card.

In some embodiments, the adjustment unit is configured to adjust, after the target data is transmitted to the accelerator card, the state information as an identifier for characterizing that both the accelerator card and the target cache block store data and the data is consistent.

In some embodiments, the adjustment unit is configured to modify, under a condition that receiving a target data modification instruction, the target data stored in the target cache block, and adjust the state information of the target cache block as an identifier for characterizing that both the accelerator card and the target cache block store data and the data is inconsistent.

In some embodiments, the apparatus further includes a locking unit; the locking unit is configured to perform memory locking on the cache blocks of the cache pool.

In some embodiments, the apparatus further includes a data cache determination unit, a loading unit, an add unit, a generation unit, and a transmission unit; the data cache determination unit is configured to determine, under a condition that receiving an acceleration processing instruction of first data, whether the first data is cached by the cache pool; the loading unit is configured to load, under a condition that the first data is not cached by the cache pool, the first data from a disk into the cache pool; the add unit is configured to add the first data in the cache pool to a DMA transmission linked list; the generation unit is configured to generate a DMA descriptor according to meta information corresponding to a cache block storing the first data; and the transmission unit is configured to transmit the DMA descriptor to the accelerator card, whereby the accelerator card acquires the first data contained in the DMA transmission linked list according to the DMA descriptor.

In some embodiments, the data cache determination unit includes a construction subunit, a division subunit, a first determination subunit, and a second determination subunit; the constructing subunit is configured to construct, under a condition that receiving the acceleration processing instruction of the first data, a file information linked list according to a file number and data volume of the first data; the division subunit is configured to divide the first data into file blocks according to a set capacity unit; the first determination subunit is configured to traverse a file block of the file information linked list, and determine whether the current file information linked list is empty; the second determination subunit is configured to determine, under a condition that the current file information linked list is not empty, whether the current file block is cached by the cache pool; accordingly, the loading unit is configured to load, under a condition that the current file block is not cached by the cache pool, the current file block from the disk into the cache pool, add the current file block in the cache pool to the DMA transmission linked list; until the current file information linked list is empty, the generation unit is configured to execute step of generating a DMA descriptor according to meta information corresponding to a cache block storing the first data.

In some embodiments, the apparatus further includes an identification determination unit and a skip unit; the identification determination unit is configured to determine, under a condition that the current file block is cached by the cache pool, whether state information corresponding to the current cache block caching the current file block is an identifier for characterizing that both the accelerator card and the current cache block store data and the data is consistent; the add unit is configured to add, under a condition that the state information corresponding to the current cache block is an identifier for characterizing that both the accelerator card and the current cache block store data and the data is inconsistent, the current file block in the cache pool to the DMA transmission linked list; and the skip unit is configured to skip the current file block under a condition that the state information corresponding to the current cache block is the identifier for characterizing that both the accelerator card and the current cache block store data and the data is consistent.

In some embodiments, the adjustment unit is further configured to adjust, after the transmitting the DMA descriptor to the accelerator card, whereby the accelerator card acquires the first data contained in the DMA transmission linked list according to the DMA descriptor, state information corresponding to the first data in the cache pool as an identifier for characterizing that both the accelerator card and the cache pool store data and the data is consistent; the write protection setting unit is further configured to set write protection for the cache block where the first data is located.

Embodiments of the present application further provide an electronic device, including: a memory configured to store computer programs; and a processor configured to execute the computer programs to implement steps of the data access method described above.

Embodiments of the present application further provide a non-transitory readable storage medium storing thereon computer programs that, when executed by a processor, implement steps of the data access method described above.

It may be seen from the above technical solution that a cache pool matching the memory capacity of the accelerator card is created on the host side; the cache pool contains cache blocks divided according to a set capacity unit; the cache block may cache data, the cache block corresponds to the accelerator card, and the data of the cache block may be transmitted to the accelerator card. The capacity of the cache pool matches the memory capacity of the accelerator card, so a large amount of data may be cached; a capacity unit is set based on the transmission requirement of single data, which may effectively solve the problem of transmission bandwidth waste caused by an excessively small amount of single transmission data. Under a condition that acquiring a read instruction of the target data, a target cache block matching the capacity of the target data may be called from the cache pool, and the target data may be stored in the target cache block. Data of the cache pool may be transmitted to the accelerator card, and the host side may record meta information about a target cache block and set write protection for the target cache block; the meta information includes a file number to which the target data belongs, a length of the target data, address information about the target data, and state information for characterizing data synchronization state of the target cache block and the accelerator card. The state information about each cache block is adjusted according to an operation executed by data in each cache block; the state information includes an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent. In the technical solution, by creating the cache pool matching the memory capacity of the accelerator card on the host side, and dividing the cache pool into a plurality of cache blocks according to a set capacity unit, the cache blocks are continuous large block memory; the method requires few transmission descriptors and may continuously transmit a large amount of data at a time, thereby improving the bandwidth utilization and improving the efficiency of data transmission. The data read from the disk may be directly put into the cache pool, and the data in the cache pool may be directly transmitted to the accelerator card; for the host side, the target data is directly cached into a pre-allocated cache pool, without additional memory copy operation in response to a determination that transmitting to the accelerator card, which effectively reduces the transmission delay of the data. There is no repeated transmission for the content-consistent data cached in the accelerator card, which saves the transmission time and improves the execution efficiency. In addition, by setting write protection for a target cache block in which data is written, dynamic adjustment of state information may be realized in response to a determination that data in the target cache block changes, whereby the host side may learn whether data in the cache pool is synchronized with data in the accelerator card according to the state information, thereby avoiding repeated transmission of the same data.

BRIEF DESCRIPTION OF THE DRAWINGS

To explain technical solutions of the embodiments of the present application more clearly, a brief introduction will be made to drawings used in the embodiments. It is obvious that the drawings in description below are some embodiments of the present application, and the ordinarily skilled in the art may obtain other drawings according to these drawings without creative work.

DETAILED DESCRIPTION

Technical solutions in the embodiments of the present application will be described clearly and completely below in combination with drawings in the embodiments of the present application. Described embodiments are not all but part of the embodiments of the application. All other embodiments obtained by the ordinarily skilled in the art based on the embodiments in the present application without creative work shall fall within scope of protection of the present application.

Terms "include" and "have" and any variations thereof in the specification and claims of the present application and in preceding drawings are intended to cover non-exclusive inclusions. For example, processes, methods, systems, products, or devices that include a list of steps or elements are not limited to listed steps or elements but may include steps or elements not listed.

To enable the skilled in the art to better understand the technical solutions of the present application, the present application will be described in further detail concerning the drawings and implementations.

Figure 1:
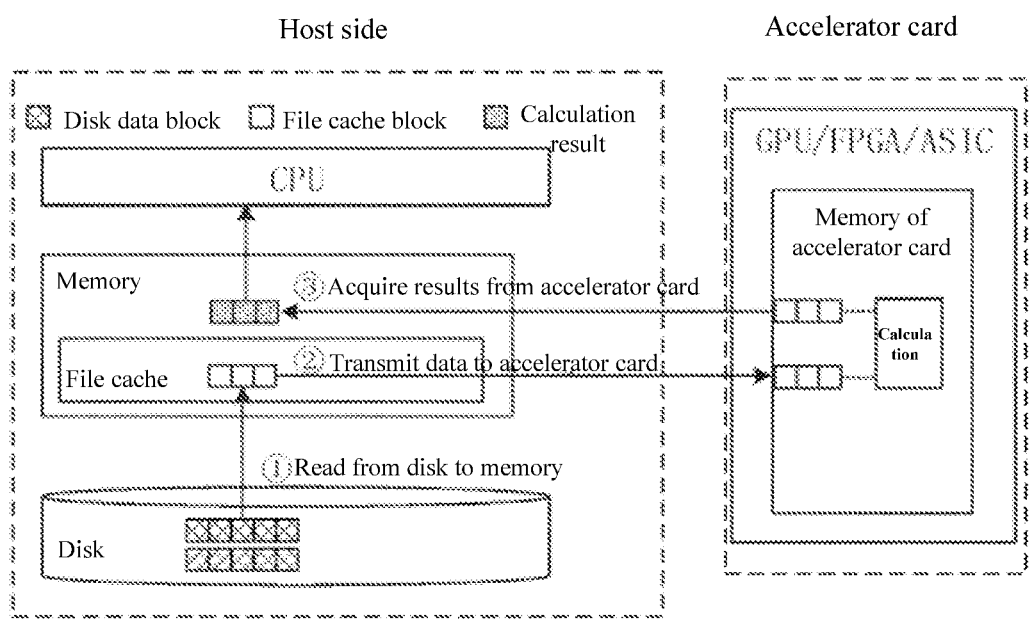
FIG. 1 is a structural diagram of a heterogeneous computing platform provided in the prior art.
Figure 2:
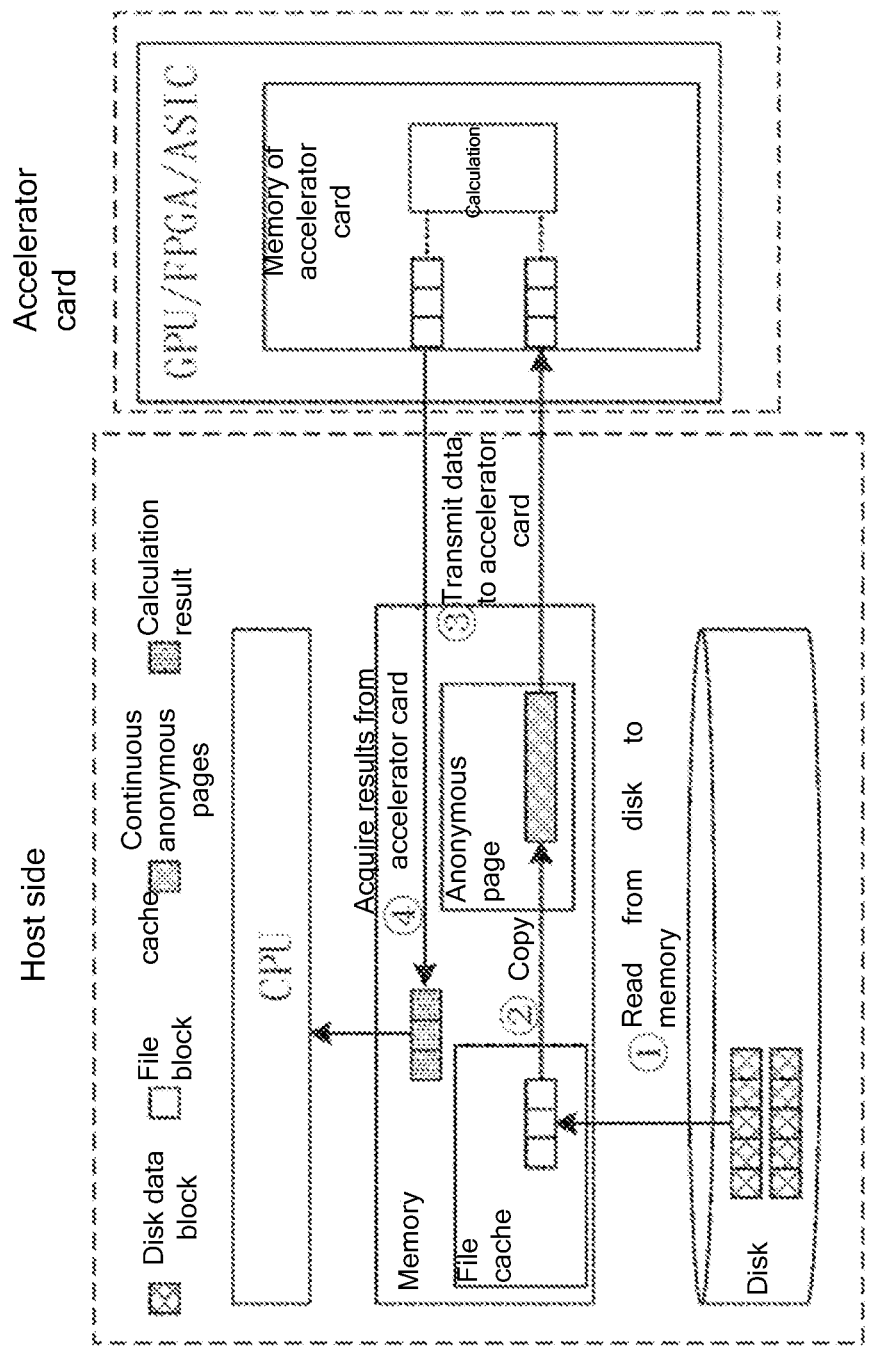
FIG. 2 is a structural diagram of a continuous memory-based heterogeneous computing platform provided in the prior art.
Figure 3:
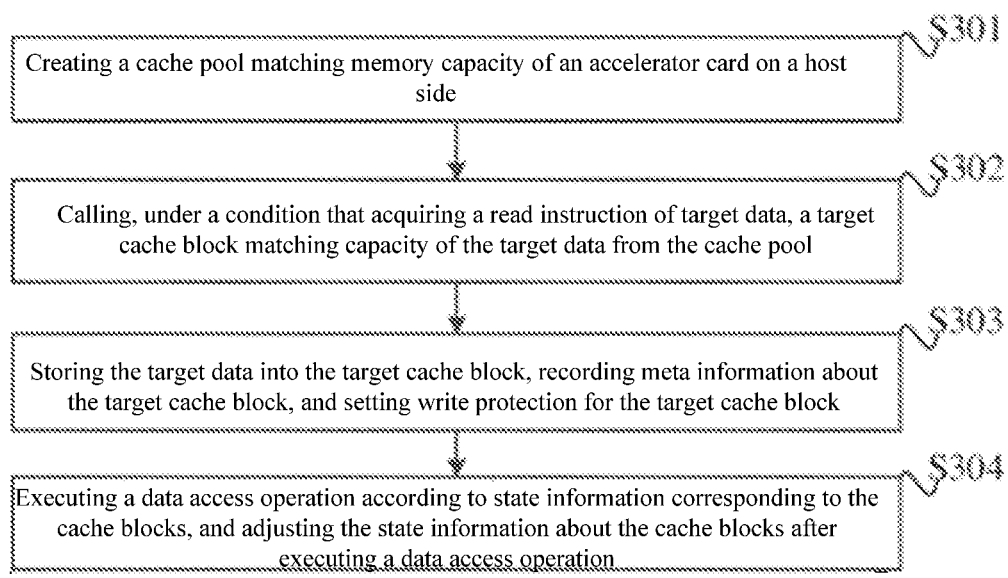
FIG. 3 is a flow chart of a data access method provided by an embodiment of the present application.

Next, a data access method provided by an embodiment of the present application will be described in detail. FIG. 3 is a flow chart of a data access method provided by an embodiment of the present application, and the method includes:

S301: Create a cache pool matching memory capacity of an accelerator card on a host side.

In the embodiment of the present application, to reduce time spent by copying internal data on the host side, a memory space matching the memory capacity of the accelerator card may be divided in a memory of the host side. Divided memory space is taken as the cache pool, and the cache pool realizes data transmission with the accelerator card.

In an implementation, the cache pool with a same memory capacity as the accelerator card may be created on the host side. For example, in response to a determination that the memory of the accelerator card is 8 GB (Gigabyte), 8 GB of memory may be divided in the memory of the host side as the cache pool.

In practical applications, capacity units may be set to improve space utilization of the cache pool and facilitate a single transmission of data. The cache pool is divided into a plurality of cache blocks according to a set capacity unit.

In the embodiment of the present application, different capacity units may be set for different cache blocks, or all cache blocks may be divided according to a same capacity unit. A value of the capacity unit is not limited, for example, the capacity units may all be set to 8 MB (MByte).

Taking all cache blocks divided by the same capacity unit as an example, assuming that a memory of the accelerator card is 8 GB, the capacity unit is 8 MB, and 8 GB/8 MB=1024, 1024 cache blocks may be set on the host side.

Figure 4:
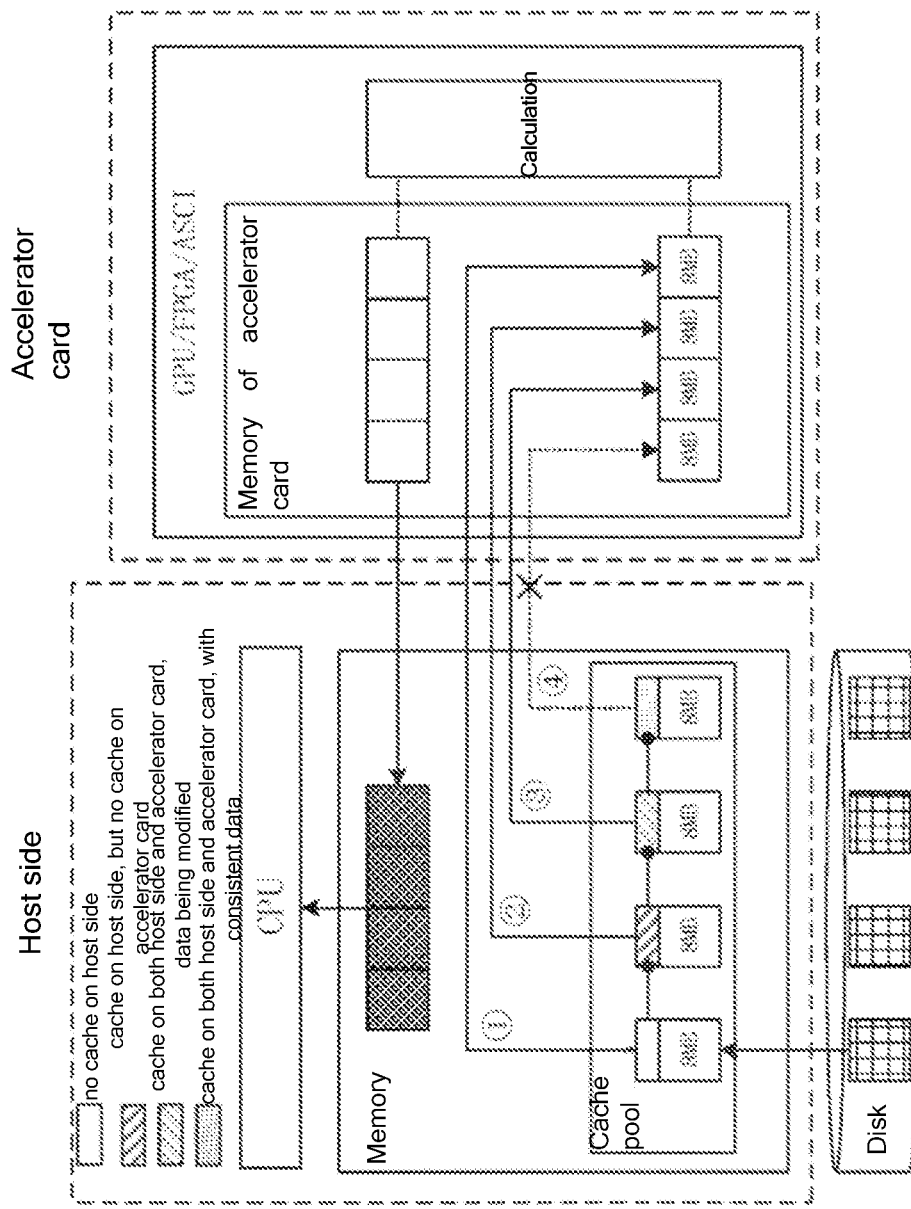
FIG. 4 is a diagram of a file system caching architecture provided by an embodiment of the present application.

FIG. 4 is a diagram of a file system caching architecture provided by an embodiment of the present application. Three parts: disk, host side, and accelerator card are included in FIG. 4. For ease of illustration, four cache blocks are illustrated in FIG. 4, with arrows indicating the direction of data transmission. Taking one data block as an example, data transmission between the host side and the accelerator card may be divided into four cases as follows: (1) The host side does not cache the data block. (2) The host side caches the data block, but the accelerator card does not cache the data block. (3) Both the host side and the accelerator card cache the data block, but data on the host side is modified, resulting in inconsistent data cached by the host side and the accelerator card. (4) Both the host side and the accelerator card cache the data block, and the cached data is consistent.

For a first case, to achieve a consistency of data between the host side and the accelerator card, it is possible to read data from the disk to the cache block of the cache pool, transmit cached data into the memory of the accelerator card, and modify a state information about the cache block as follows: both the host and accelerator cache the data and the data is consistent.

For a second case, to achieve the consistency of the data between the host side and the accelerator card, it is possible to transmit the data of the cache block to the accelerator card, and modify the state information about the cache block as follows: both the host and accelerator cache the data and the data is consistent.

For a third case, to achieve the consistency of the data between the host side and the accelerator card, it is possible to transmit the data of the cache block to the accelerator card, and modify the state information about the cache block as follows: both the host and accelerator cache the data and the data is consistent.

For a fourth case, the data of the host side is consistent with that of the accelerator card, so there is no need to perform a transmission operation on the cache block, avoiding repeated data transmission and reducing bandwidth occupation.

S302: Call, under a condition that acquiring a read instruction of target data, a target cache block matching capacity of the target data from the cache pool.

In an initial state, the cache pool does not store data, and the data are both in the disk. Under a condition that acquiring a read instruction of the target data, the target data needs to be read from the disk. In order to cache the target data, a target cache block matching the capacity of the target data needs to be called from the cache pool.

Taking the capacity of each cache block being 8 MB as an example, assuming that a data volume of the target data is 15 MB, two cache blocks are required to accommodate the target data. For ease of differentiation, the cache block configured to cache the target data is referred to as the target cache block.

S303: Store the target data into a target cache block, record meta information about the target cache block, and set write protection for the target cache block.

To enable the host side to accurately acquire a synchronization state between the data stored in the cache pool and the data stored in the accelerator card, meta information may be set for each target cache block. The meta information may include state information for characterizing a data synchronization state between the target cache block and the accelerator card, a file number to which the target data belongs, the a length of the target data, and address information about the target data.

The address information about the target data may include an offset of the target data in the file, a source address of the target data in the cache pool, and a destination address of the accelerator card corresponding to the source address.

In practical applications, a plurality of cache blocks may be required to accommodate a complete file, and at this time, the file may be divided into a plurality of target data according to the capacity of each cache block, and each target data is stored in a cache block with a corresponding capacity. For ease of differentiation of a sequence of each target data, a block number may be added to meta information.

In addition, to understand how long the data is stored in the cache block to support a replacement algorithm (for example, least recently used (LRU)) of the cache linked list, a time stamp may be added to the meta information, and the time under a condition that the cache block writes the target data is used as the time stamp.

Figure 5:
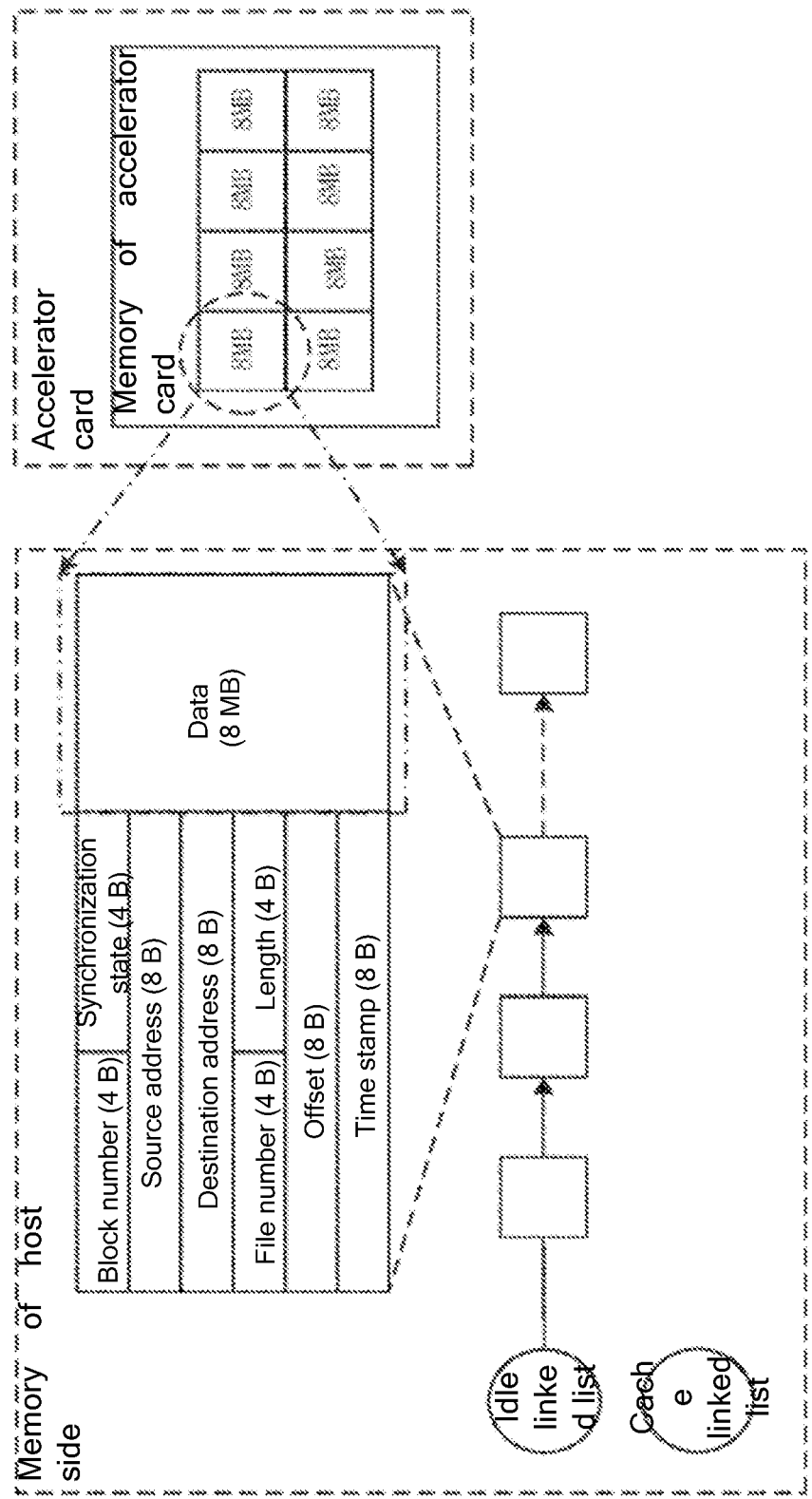
FIG. 5 is a diagram of meta information provided by an embodiment of the present application.

FIG. 5 is a diagram of meta information provided by an embodiment of the present application. In FIG. 5, taking the capacity of each cache block being 8 MB as an example, each cache block corresponds to one piece of the meta information, and the meta information may include eight elements of a block number, a synchronization state, a source address, a destination address, a file number, a length, an offset, and a time stamp. Each element corresponds to a storage space, for example, the block number may be recorded using a 4-byte, that is, 4 B. The source address may be recorded using an 8-byte. In practical applications, the elements contained in the meta information may also be added or deleted according to requirements, and the elements contained in the meta information in FIG. 5 are merely for example, and do not limit the elements contained in the meta information.

Taking the capacity of each cache block being 8 MB as an example, assuming that there is 8 GB of memory in the accelerator card, the host side applies for 1024 cache blocks, and a physical memory address of each cache block is continuous. All cache blocks are locked in memory, and all pages may be marked as non-exchangeable to the disk by modifying the page flag bit. To realize a correspondence between the cache blocks in the cache pool and the memory of the accelerator card, the memory of the accelerator card may be divided into 1024 memory blocks in a unit of 8 MB, and the address of the data area may be written into the source address in the cache block on the host side, and the offset of the memory block of the accelerator card may be written into the destination address.

S304: Execute a data access operation according to the state information corresponding to the cache blocks, and adjust the state information about the cache blocks after executing the data access operation.

Considering that in practical applications, the data synchronization state between the cache pool on the host side and the accelerator card may include four cases. A first case is that neither the cache pool nor the accelerator card caches data. A second case is that the cache pool caches data, and the accelerator card does not cache data. A third case is that both the cache pool and the accelerator card store data and the data is consistent. A fourth case is that both the cache pool and the accelerator card store data and the data is inconsistent.

The cache pool may be divided into a plurality of cache blocks according to the set capacity unit, and each cache block is a continuous large block memory. Data transmission uses a cache block as a basic transmission unit. And corresponding state information is set for each cache block. In combination with the four cases included in the data synchronization state between the cache pool on the host side and the accelerator card, the state information may include an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

Figure 6:
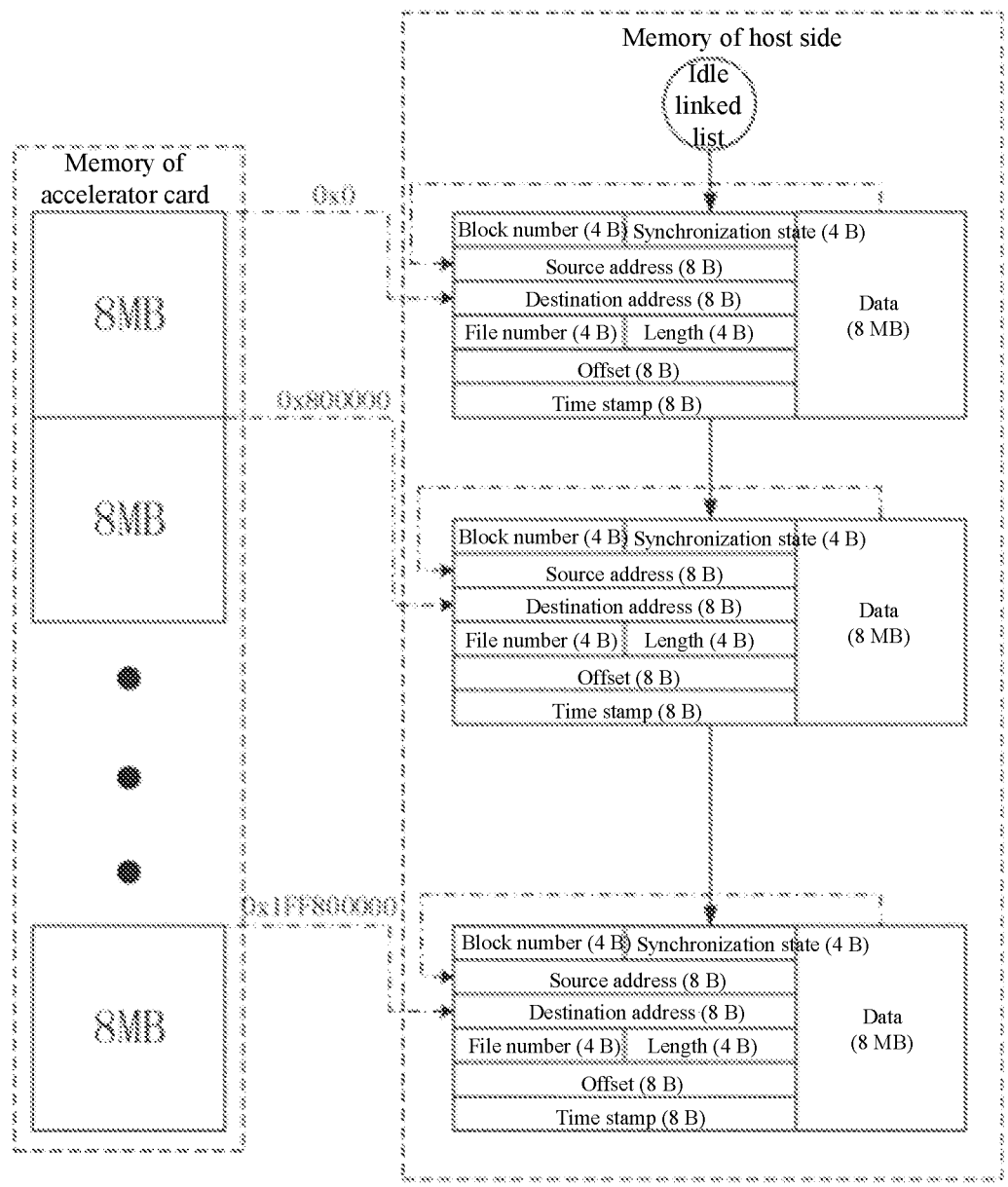
FIG. 6 is a diagram of a cache pool on a host side caching data provided by an embodiment of the present application.

FIG. 6 is a diagram of a cache pool on a host side caching data provided by an embodiment of the present application. In FIG. 6, the memory of the accelerator card is divided into 1024 accelerator card memory blocks in units of 8 MB, and the host side is correspondingly divided into 1024 cache blocks, with a data area of each cache block being 8 MB in size, and the physical memory addresses being continuous. The cache blocks are placed in the idle linked list. All cache blocks are locked in memory, and all pages are marked as non-exchangeable to the disk by modifying the page flag bit. The address of the data area may be written into the source address in the cache block on the host side, and the offset of the memory block of the accelerator card may be written into the destination address.

A cache pool contains a plurality of cache blocks. After some cache blocks in the cache pool store data, under a condition that there is new data requiring to be cached, an idle cache block requires to be selected from the cache pool for storing the new data. To facilitate the calling of a cache block, in the embodiment of the present application, after the host side creates a cache pool matching the memory capacity of the accelerator card, an idle linked list and a cache linked list may be created. The idle linked list is configured to store unused cache blocks, and the cache linked list is configured to store used cache blocks.

Accordingly, under a condition that acquiring the read instruction of the target data, a target cache block matching the capacity of the target data may be selected from the idle linked list and the cache linked list. The selected target cache block is configured to store target data, and therefore the target cache block may be stored in the cache linked list.

The cache blocks in the cache linked list all store data, and the cache blocks in the idle linked list are unused idle cache blocks. In practical applications, there is a problem of insufficient accommodation space for the idle cache blocks in the idle linked list, and at this moment, some cache blocks need to be released from the cache linked list to ensure smooth caching of data.

It may be seen from the above technical solution that the cache pool matching the memory capacity of the accelerator card is created on the host side. The cache pool contains cache blocks divided according to the set capacity unit. The cache block may cache data, the cache block corresponds to the accelerator card, and the data of the cache block may be transmitted to the accelerator card. The capacity of the cache pool matches the memory capacity of the accelerator card, so a large amount of data may be cached. A capacity unit is set based on the transmission requirement of single data, which may effectively solve a problem of transmission bandwidth waste caused by an excessively small amount of single transmission data. Under a condition that obtaining a read instruction of the target data, the target cache block matching the capacity of the target data may be called from the cache pool, and the target data may be stored in the target cache block. Data of the cache pool may be transmitted to the accelerator card, and the host side may record the meta information about the target cache block and set write protection for the target cache block. The meta information includes the file number to which the target data belongs, the length of the target data, the address information about the target data, and the state information for characterizing data synchronization state of the target cache block and the accelerator card. The state information about each cache block is adjusted according to an operation executed by data in each cache block. The state information includes an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

In the technical solution, by creating the cache pool matching the memory capacity of the accelerator card on the host side, and dividing the cache pool into a plurality of cache blocks according to a set capacity unit, the cache blocks are continuous large block memory. The method requires few transmission descriptors and may continuously transmit a large amount of data at a time, thereby improving the bandwidth utilization and improving the efficiency of data transmission. The data read from the disk may be directly put into the cache pool, and the data in the cache pool may be directly transmitted to the accelerator card. For the host side, the target data is directly cached into a pre-allocated cache pool, without additional memory copy operation under a condition that transmitting to the accelerator card, which effectively reduces the transmission delay of the data. There is no repeated transmission for the content-consistent data cached in the accelerator card, which saves the transmission time and improves the execution efficiency. In addition, by setting write protection for a target cache block in which data is written, dynamic adjustment of state information may be realized in response to a determination that data in the target cache block changes, whereby the host side may learn whether data in the cache pool is synchronized with data in the accelerator card according to the state information, thereby avoiding repeated transmission of the same data.

Conventionally, the operating system divides the physical memory into fixed-size pages (typically 4 KB), which are managed by page size. Each page has a flag bit indicating whether the memory may be temporarily stored on the disk. For a memory page that may be temporarily stored on the disk, in response to a determination that the operating system has insufficient memory, the data in the page will be written into the disk, thereby freeing up a free page for use by other processes, and this operation is called page swapping out. In heterogeneous computing scenarios, to ensure that pages are not accidentally swapped out to the disk in the process of transmitting data from the host side to the accelerator card, it is necessary to modify the flag bit of corresponding pages to be non-swappable, and this operation is called page locking.

To avoid the cache pool being occupied by other applications, or the data in the cache pool being unreasonably released back to the disk, in the embodiment of the present application, after the host side creates a cache pool matching the memory capacity of the accelerator card, memory locking may be performed on the cache blocks of the cache pool, to prevent other processes from occupying or memory pages from being switched to the disk.

Figure 7:
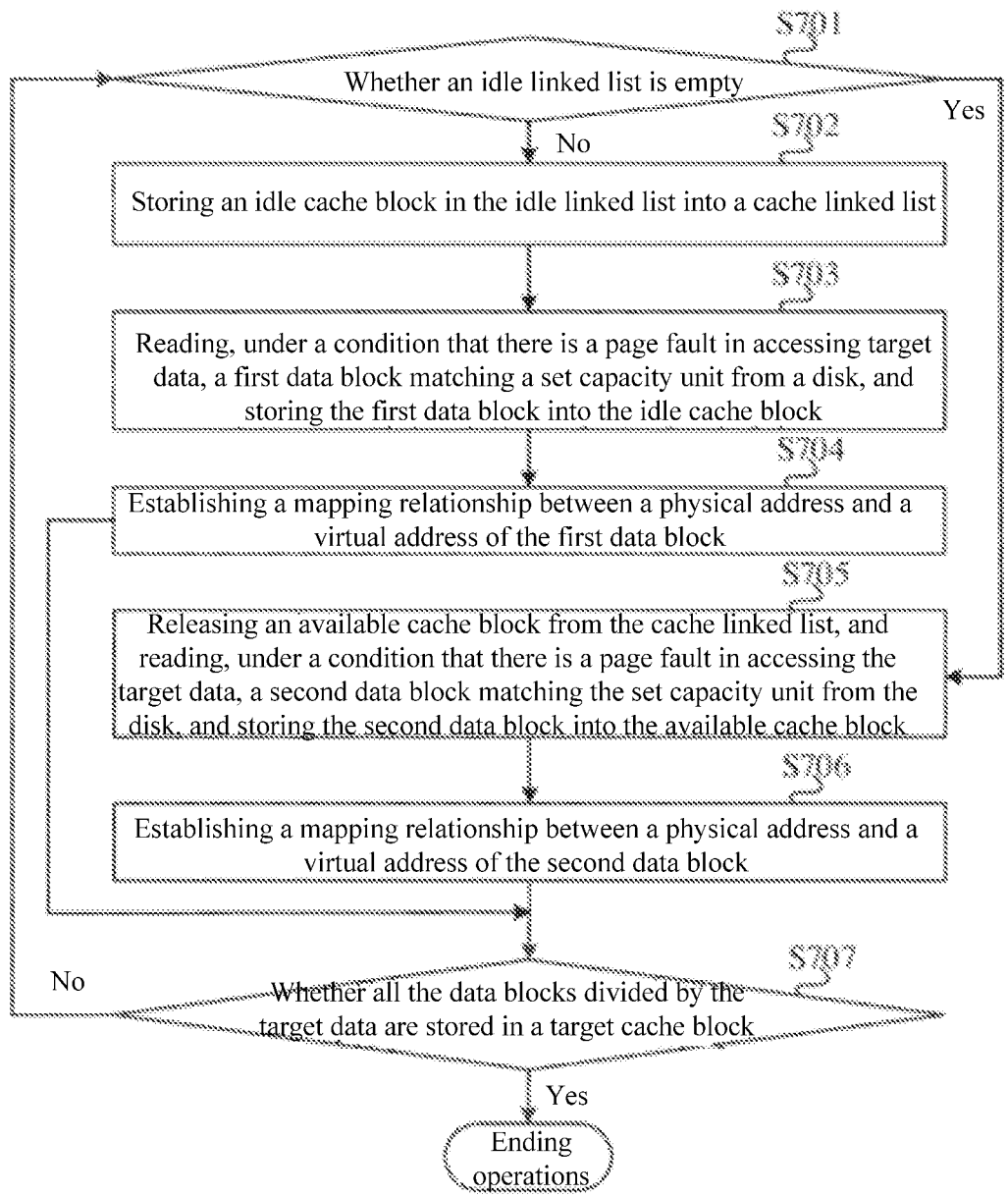
FIG. 7 is a flow chart of a method for selecting a target cache block from an idle linked list and a cache linked list to store target data provided by an embodiment of the present application.

FIG. 7 is a flow chart of a method for selecting a target cache block from an idle linked list and a cache linked list to store target data provided by an embodiment of the present application, and the method includes:

S701: Determine whether the idle linked list is empty.

In an embodiment of the present application, the idle linked list contains unused idle cache blocks. In some embodiments, under a condition that data needs to be cached, an idle cache block for caching data is selected from the idle linked list.

In response to a determination that performing caching of target data, it needs to determine whether the idle linked list is empty.

Under a condition that the idle linked list is not empty, it indicates that the idle cache block may be selected from the idle linked list to store data, and S702 may be executed at this moment. Under a condition that the idle linked list is empty, the available cache blocks need to be released from the cache linked list for storing data, that is, S705 is executed.

S702: Store an idle cache block in the idle linked list into the cache linked list.

The selected idle cache block needs to store the target data, and for ease of the management of the cache block, the selected space cache block may be stored in the cache linked list to store the target data in the idle cache block of the cache linked list.

S703: Read, under a condition that there is a page fault in accessing the target data, a first data block matching the set capacity unit from a disk, and store the first data block into the idle cache block.

Each file in the file system has a unique file number, that is, index number. According to the index number, the operating system may find the data block of the file in the disk. Under a condition that the CPU accesses disk file data, the operating system will raise a page fault in response to a determination that the data is not in memory. In the page fault, the CPU hardware marks the cause of the page fault is no corresponding physical address. Conventionally, the operating system calls a universal cache application interface of the file system, applies for memory as a file cache block taking 4 KB as a unit, stores disk data, and then establishes a mapping relationship between the physical address of the cache block and the virtual address of the file. In response to a determination that the CPU accesses the file data again, a page fault without a physical address does not occur.

In the embodiment of the present application, in response to a determination that target data is acquired, data is read according to a size of 4 KB. Under a condition that there is a page fault in a currently read data, a data block corresponding to the current data may be read according to a set capacity unit, and the data block may be referred to as a first data block.

The first data block may be part or all of the target data. For example, the target data is 7 MB, and the currently read data belongs to data between 0 MB and 7 MB. The target data between 0 MB and 7 MB may be used as the first data block. As another example, the target data is 15 MB, and the currently read data belongs to data between 0 MB and 8 MB (excluding the $8^{th}$ MB), and the data between 0 MB and 8 MB in the target data may be used as the first data block. In some embodiments, under a condition that the currently read data belongs to data between 8 MB and 15 MB (including the 8th MB), the data between 8 MB and 15 MB in the target data may be used as the first data block.

Under a condition that there is a page fault in accessing the target data, the host side reads the first data block from the disk and stores the first data block into the idle cache block.

S704: Establish a mapping relationship between the physical address and the virtual address of the first data block.

After storing the first data block into the idle cache block, a mapping relationship between the physical address and the virtual address may be established.

After the idle cache block stores the first data block, a file number of the first data block, a length of the first data block, an offset of the first data block in the file, a source address for indicating the idle cache block where the first data block is located, a destination address of an accelerator card corresponding to the source address, and state information for characterizing a data synchronization state of the idle cache block and the accelerator card may be recorded.

S705: Release an available cache block from the cache linked list, and read, under a condition that there is a page fault in accessing the target data, a second data block matching the set capacity unit from the disk, and store the second data block into the available cache block.

Under a condition that the idle linked list is empty, it indicates that it is necessary to release some cache blocks from the cache linked list to ensure the smooth caching of target data.

In an embodiment of the present application, releasing an available cache block from the cache linked list may be selecting a cache block with the longest data storage time from the cache linked list, and the data of the cache block is written back to the disk, at this time, the cache block is empty. For ease of differentiation, the cache block may be referred to as an available cache block.

In an implementation, an available cache block may be selected from a cache linked list according to the replacement algorithm (for example, LRU) of the cache linked list. The original data in the available cache blocks is written back to the disk.

For example, it is assumed that the capacity of target data is 15 MB, the capacity of each cache block is 8 MB, an idle linked list contains one idle cache block, and all the cache blocks in the cache linked list store data. At this time, to store the target data, the idle cache block in the idle linked list may be stored in the cache linked list, and the idle cache block may store 8 MB data. And for the remaining 7 MB data, it is necessary to release one available cache block from the cache linked list to use the released one available cache block to store the remaining 7 MB data, thereby achieving smooth storage of the target data.

S706: Establish a mapping relationship between the physical address and the virtual address of the second data block.

After the second data block is stored in the available cache block, the mapping relationship between the physical address and the virtual address of the second data block may be established.

After the second data block is stored in the available cache block, a file number of the second data block, a length of the second data block, an offset of the second data block in the file, a source address for indicating the available cache block where the second data block is located, a destination address of the accelerator card corresponding to the source address, and state information for characterizing a data synchronization state of the available cache block and the accelerator card may be recorded.

S707: Determine whether all the data blocks divided by the target data are stored in the target cache block.

Under a condition that some data blocks in the target data are not stored in the target cache block, then return to S701, until under a condition that all the data blocks divided by the target data are stored in the target cache block, then end the operation.

Figure 8:
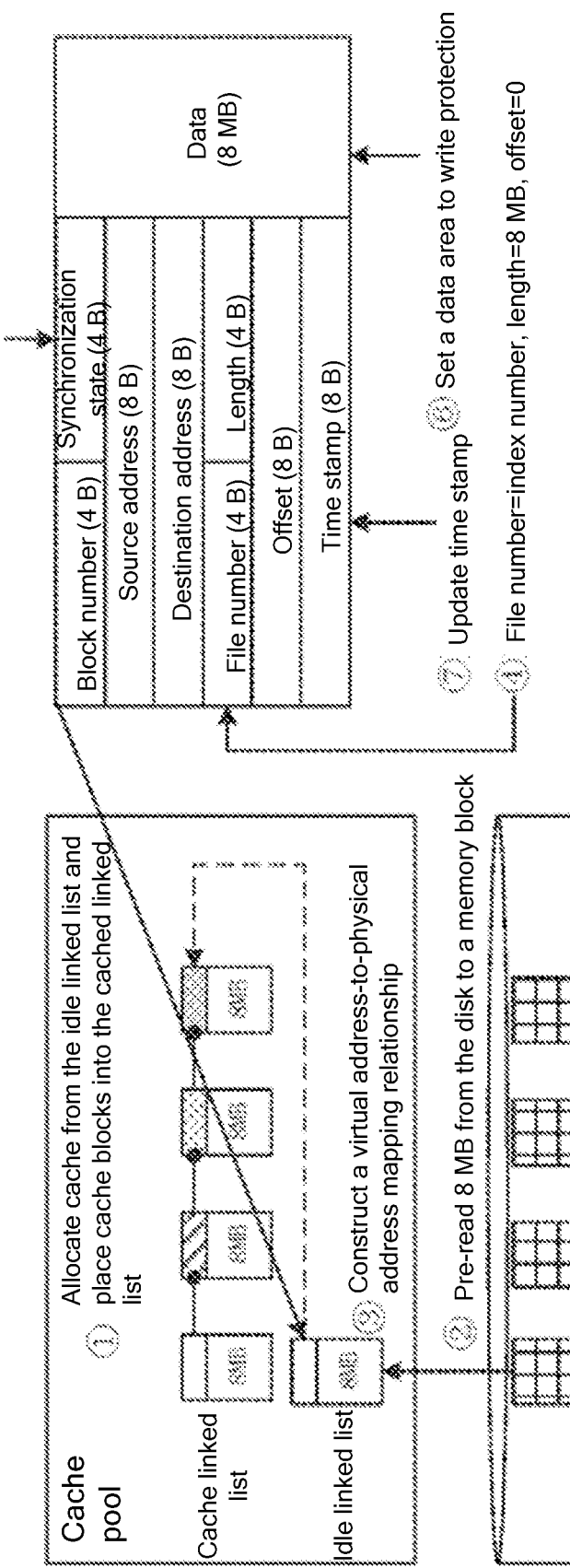
FIG. 8 is a diagram of an idle cache block storing data provided by an embodiment of the present application.

Taking the capacity of each cache block being 8 MB as an example, it is assumed that a file is 15 MB in size, the file is not cached, an idle cache block remains in the idle linked list in the cache pool, and the file will be divided into two data blocks according to 8 MB. FIG. 8 is a diagram of an idle cache block storing data provided by an embodiment of the present application. A first data block reading process is as shown in FIG. 8, including: (1) An idle cache block is fetched from the idle linked list, and the idle cache block is put into the cache linked list. A dashed line with an arrow in FIG. 8 indicates placing the idle cache block into the cache linked list. (2) 8 MB of data is read from disk to store in the idle cache block. (3) A virtual address-to-physical address mapping relationship is set. (4) The length of the idle cache block is set to be 8 MB, the file number to be a corresponding index number, and the file offset to be 0. (5) The status of the idle cache block is marked as 1, indicating that the data stored in the idle cache block has not been cached in the memory of the accelerator card. (6) The page table attribute of the 8 MB data area is set to write protection. (7) The time stamp is updated.

Figure 9:
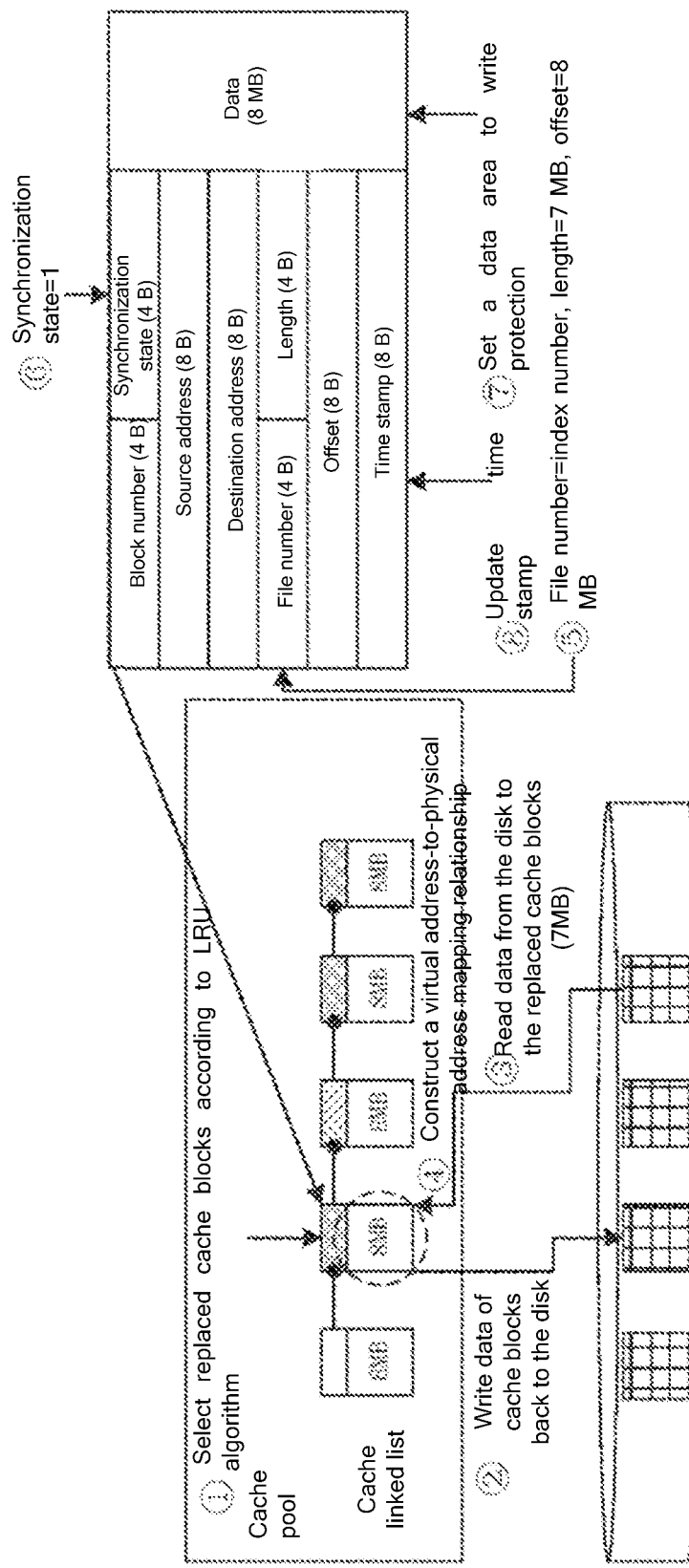
FIG. 9 is a diagram of an available cache block storing data provided by an embodiment of the present application.

FIG. 9 is a diagram of an available cache block storing data provided by an embodiment of the present application. A second data block reading process is shown in FIG. 9, including: (1) According to the LRU algorithm, a replaced cache block is selected from the cache linked list. (2) The data of the cache block is written back to the disk, under a condition that there is no data in the cache block, and the cache block may be referred to as an available cache block. (3) 7 MB of data is read from the disk to the replaced cache block. (4) The virtual address-to-physical address mapping relationship is set. (5) The length of the cache block is set to 7 MB, the file number to be a corresponding index number, and the file offset to be 8 MB. (6) The cache block status is marked as 1, indicating that the data stored in the cache block has not been cached in the memory of the accelerator card. (7) The page table attribute of the 8 MB data area is set to write protection. (8) The time stamp is updated. The time stamp may be the time the cache block writes data.

Note that in the embodiment of the present application, meta information corresponding to each cache block may be separately mounted, and the corresponding cache block may be pointed to by setting a pointer. The meta information and the cache block may also be placed in one block, and accordingly, a cache pool may be constructed based on the storage space occupied by each piece of the meta information and the memory capacity of the accelerator card.

In the embodiments of the present application, after target data is stored in a target cache block, meta information about the target cache block is recorded, and write protection is set on the target cache block, in response to a determination that an operation of transmitting the target data to an accelerator card is involved, the data in the accelerator card and the data in the cache block become consistent at this moment. To facilitate an operator to know a data synchronization state of the accelerator card and the cache block, a synchronization state corresponding to the cache block needs to be adjusted at this moment. Therefore, after the target data is transmitted to the accelerator card, the state information is adjusted to be an identifier for characterizing that both the accelerator card and the target cache block store data and the data is consistent. For example, the state information may take the form of a digital "0", indicating that the data of the accelerator card and the target cache block is consistent.

By setting write protection to a cache block, the behavior of the data in the cache block being manipulated may be detected whereby the synchronization status may be updated in time.

In practical applications, modification of the data in the cache block may be involved. After the page data in memory is written back to disk, the properties of the page are set to the write protection state. In response to a determination that the CPU modifies the page data, there will be a page fault in the operating system, and the hardware will mark the cause of the page fault as a write operation performed on the write protection area.

Conventionally, the operating system sets a flag bit of a page to be a dirty page in a processing function of a page fault of write protection, indicating that data in memory is inconsistent with data in a disk. After the background thread of the operating system writes a page marked as a dirty page to the disk, the dirty page mark of the page may be canceled, and the page property is reset to write protection.

In a heterogeneous acceleration scenario, after the memory of the host side is modified, the cache block on the host side is inconsistent with the disk and the memory of the accelerator card. After the background thread of the operating system writes the dirty page to the disk, the cache block on the host side is consistent with the disk data, but still inconsistent with the memory of the accelerator card.

Therefore, in the embodiment of the present application, the management of the cache block of the accelerator card is added in the write protection page fault, the state information for characterizing the data synchronization state of the cache block and the memory of the accelerator card is added in the meta information corresponding to the cache block, and whether the contents of the cache block on the host side and the memory block of the accelerator card are consistent is marked through the state information.

In practical applications, under a condition that the host side receives the target data modification instruction, the target data stored in the target cache block will be modified, and at this time, the state information may be adjusted together as an identifier for characterizing that both the accelerator card and the target cache block store data and the data is inconsistent. For example, the state information may take the form of a number "2", indicating that the data of the accelerator card and target cache block is inconsistent.

Figure 10:
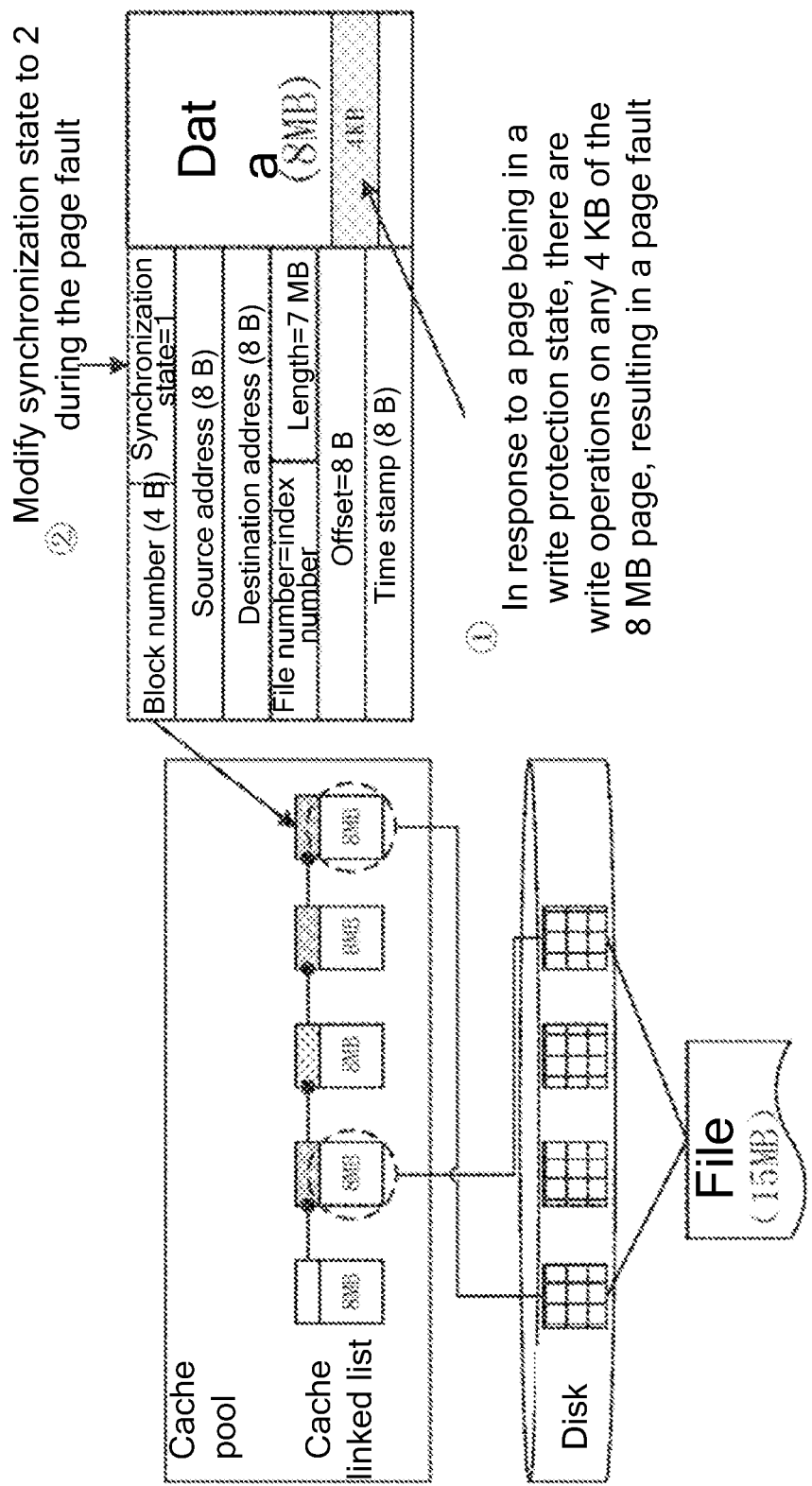
FIG. 10 is a diagram of modifying data of a cache block provided by an embodiment of the present application.

FIG. 10 is a diagram of modifying data of a cache block provided by an embodiment of the present application. Assuming that a 15 MB file has been cached by the cache pool, the first cache block storing 8 MB data and the second cache block storing 7 MB data. Since the data page is set as write protection, for any 15 MB data page, the occurrence of a write operation will trigger a page fault, and the system will mark the reason for the page fault as follows: there is a write operation at the write protection page. In the embodiment of the present application, the state information corresponding to the cache block is modified to 2 in the corresponding page fault processing logic, indicating that the data of the accelerator card and the cache block is inconsistent.

In the embodiment of the present application, the data of the disk may be directly cached in a continuous large block memory. By adding state information about a data synchronization state in a cache block and a memory of an accelerator card, it may be known in time whether data in the memory of the accelerator card is consistent with data in the cache block. For example, under a condition that data of the cache block has been stored in the accelerator card, the state information at this moment is 0, indicating that the data of the accelerator card and the cache block are consistent. Under a condition that it is necessary to perform an operation on the data using the accelerator card, it is no longer necessary to transmit the data from the cache block to the accelerator card, reducing unnecessary data transmission.

Figure 11:
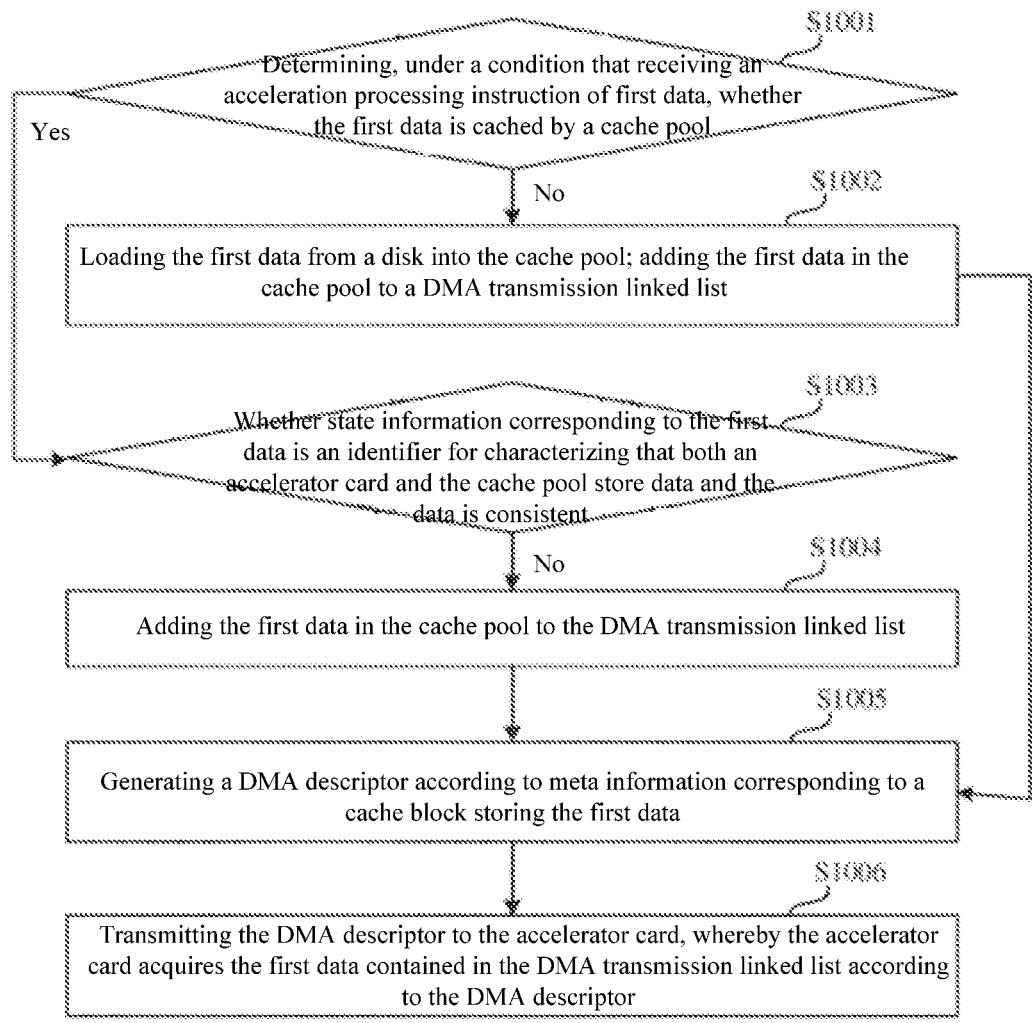
FIG. 11 is a flow diagram of a method for transmitting data to an accelerator card provided by an embodiment of the present application.

FIG. 11 is a flow diagram of a method for transmitting data to an accelerator card provided by an embodiment of the present application, and the method includes:

S1001: Determine, under a condition that receiving an acceleration processing instruction of first data, whether the first data is cached by the cache pool.

In an embodiment of the present application, the data currently required to be transmitted to the accelerator card may be referred to as the first data to be easily distinguished from other data.

Under a condition that the first data is not cached by the cache pool, the first data needs to be read from the disk at this time, that is, S1002 is executed.

Under a condition that the first data is cached by the cache pool, it needs to be further determined whether the first data has been stored in the accelerator card, that is, S1003 is executed.

S1002: Load the first data from a disk into the cache pool, and add the first data in the cache pool to a DMA transmission linked list.

Under a condition that the first data is not cached by the cache pool, the first data needs to be read from the disk first.

In response to a determination that data is transmitted from a cache pool to an accelerator card, the data needs to be converted into a format recognizable by the accelerator card. In practical applications, a DMA transmission linked list may be constructed. And under a condition that data of the cache pool needs to be transmitted to the accelerator card, first data in the cache pool is added to the DMA transmission linked list.

S1003: Determine whether the state information corresponding to the first data is an identifier for characterizing that both the accelerator card and the cache pool store data and the data is consistent.

Under a condition that the state information corresponding to the first data is an identifier for characterizing that both the accelerator card and the cache pool store data and the data is inconsistent, S1004 is executed.

Under a condition that the state information corresponding to the first data is an identifier for characterizing that both the accelerator card and the cache pool store data and the data is consistent, it indicates that the first data has been stored in the accelerator card, and at this time, it is not necessary to transmit the first data to the accelerator card, and the operation may be ended directly.

S1004: Add the first data in the cache pool to the DMA transmission linked list.

S1005: Generate a DMA descriptor according to meta information corresponding to a cache block storing the first data.

The DMA descriptor is configured to indicate the source address, destination address, and data length of the data in the cache block. The DMA descriptor is in a data format recognizable by the accelerator card.

S1006: Transmit the DMA descriptor to the accelerator card, whereby the accelerator card acquires the first data contained in the DMA transmission linked list according to the DMA descriptor.

The host side transmits the DMA descriptor to the accelerator card, and the accelerator card may obtain the first data based on the DMA descriptor.

In practical applications, after transmitting the DMA descriptor to the accelerator card, the accelerator card may acquire the first data contained in the DMA transmission linked list according to the DMA descriptor, and at this time, the data of the accelerator card and the cache pool is consistent. Therefore, after transmitting the DMA descriptor to the accelerator card, the state information corresponding to the first data in the cache pool may be adjusted to be an identifier for characterizing that both the accelerator card and the cache pool store data and the data is consistent. A write protection is set for the cache block where the first data is located.

In the embodiment of the present application, the data of the disk is directly cached in a continuous large block memory, and unnecessary data transmission is reduced by adding a cache block and an accelerator card memory synchronization mark, namely, state information.

Considering that in practical applications, the data volume of the first data is often greater than the capacity of a single cache block, and therefore a file information linked list may be constructed according to the file number and the data volume of the first data under a condition of receiving an acceleration processing instruction of the first data. The first data is divided into file blocks according to a set capacity unit. The file block of the file information linked list is traversed, and it is determined whether the current file information linked list is empty. And under a condition that the current file information linked list is not empty, it is determined whether the current file block is cached by the cache pool.

Accordingly, under a condition that the current file block is not cached by the cache pool, the current file block is loaded from the disk into the cache pool. The current file block in the cache pool is added to the DMA transmission linked list. Until the current file information linked list is empty, the step of generating a DMA descriptor according to meta information corresponding to a cache block storing first data is executed.

Under a condition that the current file block is cached by the cache pool, it needs to be determined whether state information corresponding to the current cache block caching the current file block is an identifier for characterizing that both the accelerator card and the current cache block store data and the data is consistent.

Under a condition that the state information corresponding to the current cache block is an identifier for characterizing that both the accelerator card and the current cache block store data and the data is inconsistent, it indicates that the current file block needs to be transmitted to the accelerator card, and at this time, the current file block in the cache pool may be added to the DMA transmission linked list.

Under a condition that the state information corresponding to the current cache block is an identifier for characterizing that both the accelerator card and the current cache block store data and the data is consistent, it indicates that the current file block has been stored in the accelerator card, and the current file block may be skipped at this moment. Until the current file information linked list is empty, it indicates that all the data required to be transmitted to the accelerator card has been added to the DMA transmission linked list, and at this moment, the DMA descriptor may be generated according to the meta information corresponding to the cache block storing the first data. The DMA descriptor is transmitted to the accelerator card, whereby the accelerator card acquires the first data contained in the DMA transmission linked list according to the DMA descriptor.

By dividing the first data into a plurality of file blocks according to the capacity of a single cache block, fast transmission of the first data may be achieved. Moreover, by setting the file information linked list, the transmission of all file blocks is ensured, and the situation of missing part of data is avoided.

For example, taking database access as an example, let the database have three tables: 1, pay scale, with a file size of 32 MB, containing fields of employee ID, monthly performance, salary, and bonus. 2, job information table, with a file size of 1 MB, containing fields of job ID, job name, and job content. 3, employee information table, with a file size of 16 MB, containing fields of employee ID, name, job ID, phone, and qualifications.

Figure 12:
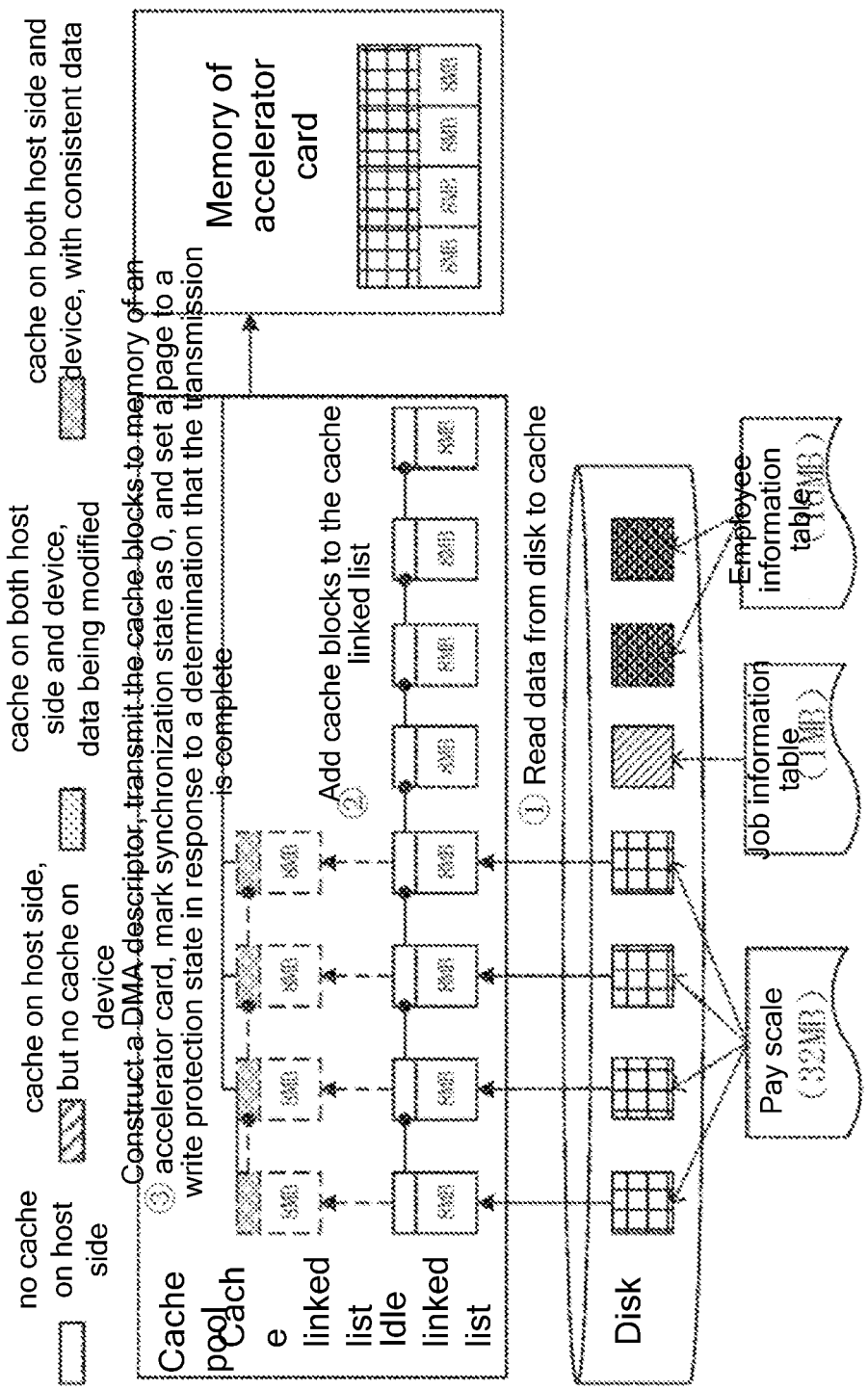
FIG. 12 is a diagram of querying total salary expenditures provided by an embodiment of the present application.

The user is set to perform the following operations: 1. Query the total salary expenditure, requiring to access the pay scale. The data block caching operation is shown in FIG. 12. (1) Four 8 MB cache blocks are allocated from the idle linked list and the disk data is loaded. (2) A cache block is added to a cache linked list. (3) A DMA descriptor is constructed according to the destination address, source address, and length information in the cache block, the data cached in the cache block is transmitted to the memory of the accelerator card, and the synchronization state is marked as 0, and the page is reset to be in a write protection state after the transmission is completed.

Figure 13:
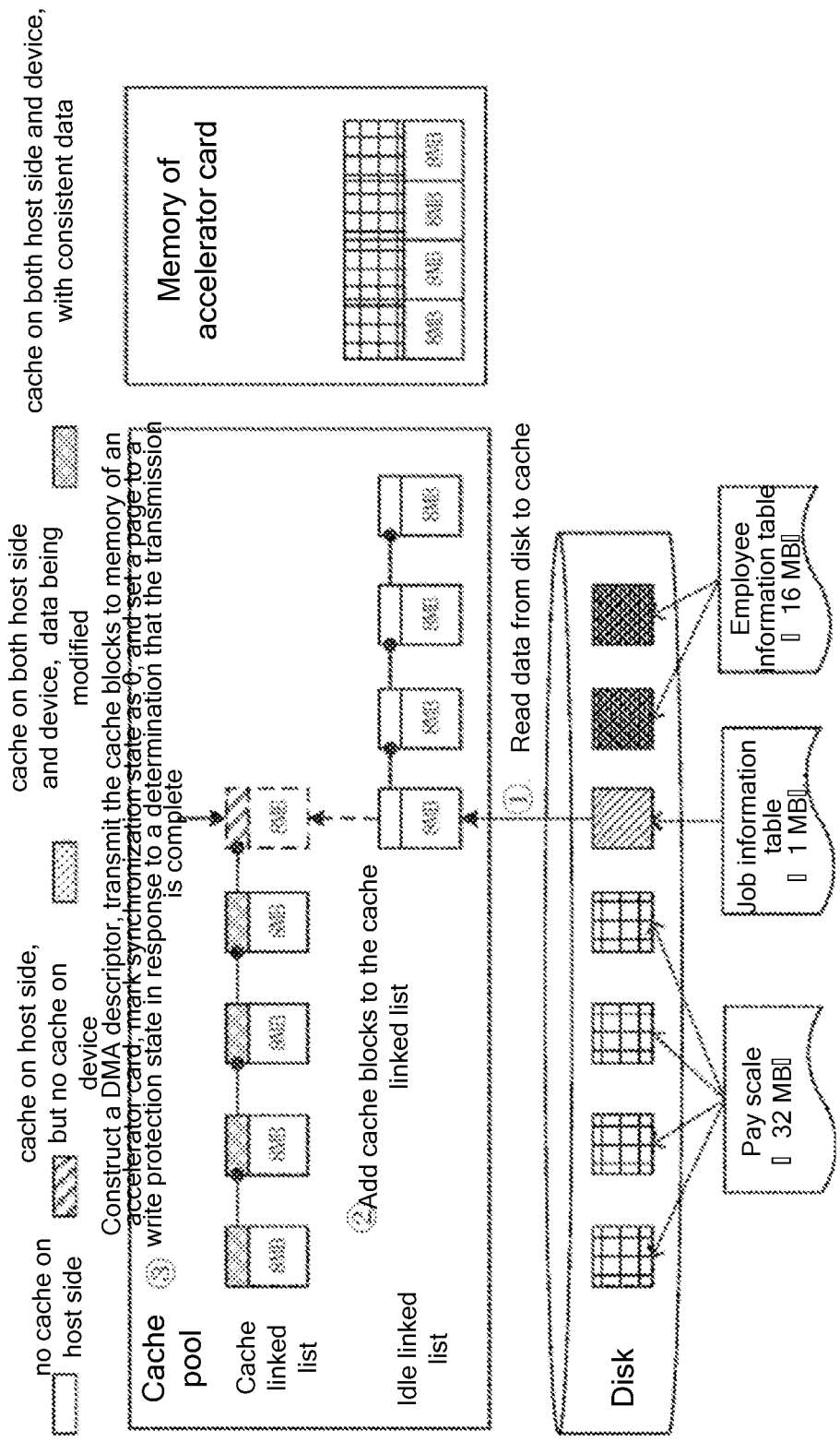
FIG. 13 is a diagram of querying a number of jobs in a company provided by an embodiment of the present application.

2. Query the number of jobs in a company, requiring to access the job information table. Since there are fewer job information tables, the tables are queried separately, assuming the CPU chooses the data block caching operation instead of heterogeneous computing, as shown in FIG. 13. (1) An 8 MB cache block is allocated from the idle linked list, and 1 MB of data is read from the disk into the cache block. (2) A cache block is placed into a cache linked list. (3) Since the data table is 1 MB in size, the data is small, and assuming that the CPU does not choose to perform heterogeneous computing, the synchronization marker of the cache block is set as 1.

Figure 14:
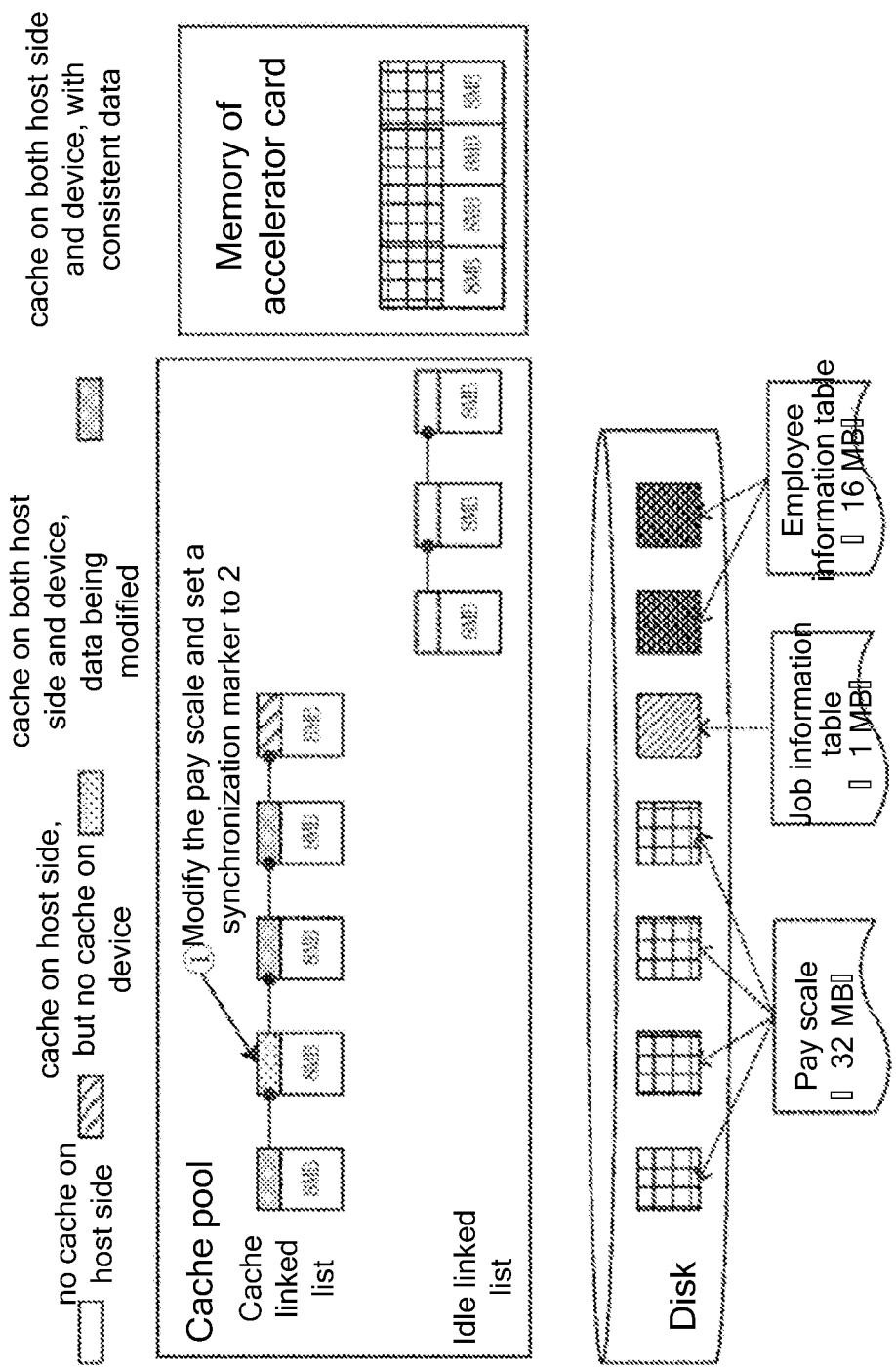
FIG. 14 is a diagram of modifying pay scale provided by an embodiment of the present application.

3. Modify the salary of some employees, requiring to modify the pay scale, with CPU modifying the relevant data block, and modifying the cache block marker as inconsistent with the memory of the accelerator card. The cache operation of the data block is shown in FIG. 14. Since partial data is modified, a page fault is triggered in response to a determination that the CPU modifies the corresponding page. In the page fault: (1) The corresponding cache block marker is modified as 2, indicating that the data of the host side cache is inconsistent with the data of the cache block in the accelerator card.

Figure 15:
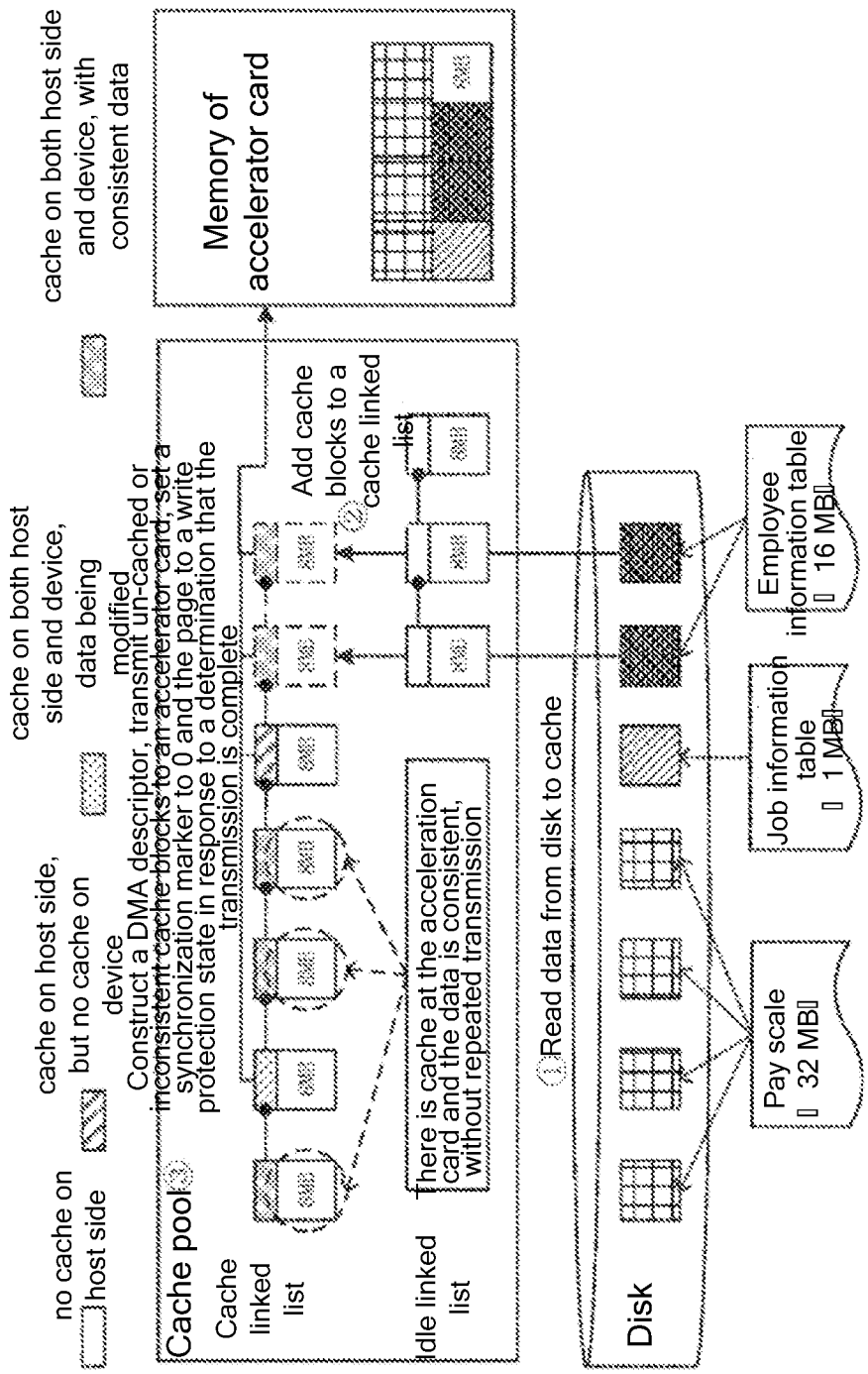
FIG. 15 is a diagram of querying a doctoral degree or above provided by an embodiment of the present application.

4. Query a doctoral degree or above and the average salary of the employees engaged in R&D positions, requiring to access the employee information table, job information table, and pay scale at the same time. The CPU selects heterogeneous computing, and for a data block that has been cached in the accelerator card and is consistent with that cached on the host side, an operation of repeated transmission of a data block is not performed, as shown in FIG. 15. (1) Two 8 MB cache blocks are allocated in the idle linked list, and data is read from the disk to the cache blocks. (2) A cache block is added to a cache linked list. (3) A DMA descriptor is constructed, the cache blocks that are not cached in the accelerator card and the cache blocks that are inconsistent with the data of the accelerator card are transmitted to the accelerator card, and the cache blocks that are cached by the accelerator card and consistent with the host side are skipped, the cache block synchronization state is modified to be 0, and the page is set to be in a write protection state.

It should be noted that the data access scheme provided by the embodiments of the present application is also applicable to the scenario with performance differences from the storage system, for example, a storage system contains an NVME hard disk, mechanical disk, and network storage. The capacity increases in order, but the performance decreases in order, and repeated transmission may also be reduced by adding tags to the data block.

Figure 16:
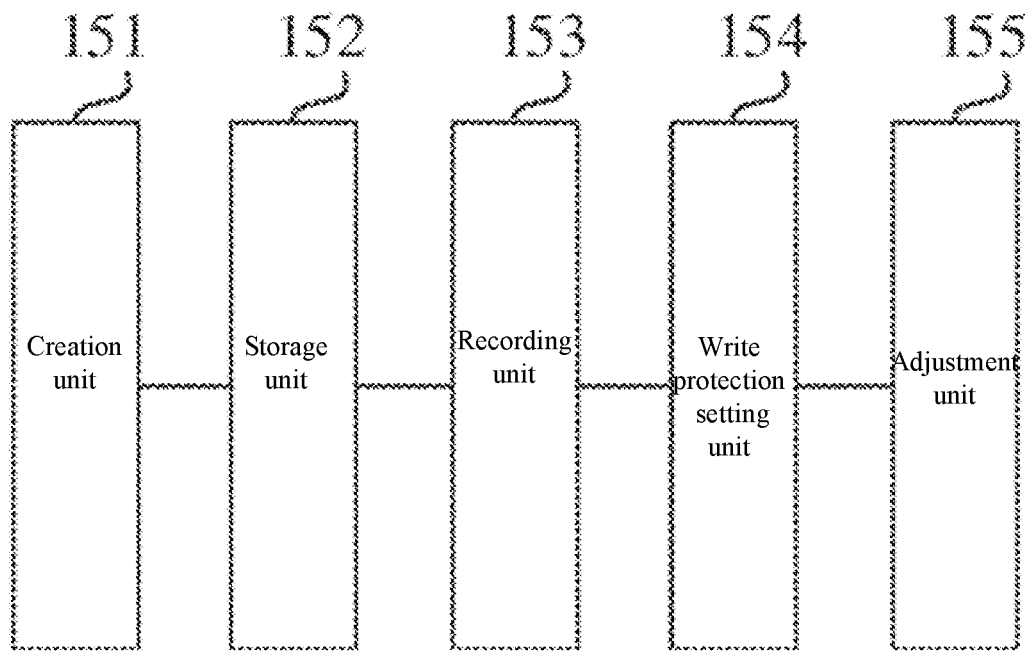
FIG. 16 is a structural diagram of a data access apparatus provided by an embodiment of the present application.

FIG. 16 is a structural diagram of a data access apparatus provided by an embodiment of the present application. The apparatus includes a creation unit 151, a storage unit 152, a recording unit 153, a write protection setting unit 154, and an adjustment unit 155.

The creation unit 151 is configured to create a cache pool matching memory capacity of an accelerator card on a host side, the cache pool containing cache blocks divided according to a set capacity unit. The storage unit 152 is configured to call, under a condition that acquiring a read instruction of target data, a target cache block matching capacity of the target data from the cache pool, and store the target data into the target cache block. The recording unit 153 is configured to record meta information about the target cache block, where the meta information includes a file number to which the target data belongs, a length of the target data, address information about the target data, and state information for characterizing data synchronization state of the target cache block and the accelerator card. The write protection setting unit 154 is configured to set write protection for the target cache block. And the adjustment unit 155 is configured to execute a data access operation according to state information corresponding to the cache blocks, and adjust the state information about the cache blocks after executing the data access operation, where the state information includes an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

In some embodiments, the apparatus further includes a linked list creation unit. The linked list creation unit is configured to create an idle linked list and a cache linked list, where the idle linked list is configured to store unused cache blocks, and the cache linked list is configured to store used cache blocks. Accordingly, the storage unit is configured to select, under a condition that acquiring the read instruction of the target data, the target cache block matching the capacity of the target data from the idle linked list and the cache linked list, and store the target data into the target cache block, where the target cache block is stored in the cache linked list.

In some embodiments, the storage unit includes a store subunit, a first reading subunit, a first storage subunit, a first establishment subunit, a release subunit, a second reading subunit, a second storage subunit, and a second establishment subunit. The store subunit is configured to store one idle cache block in the idle linked list into the cache linked list under a condition that the idle linked list is not empty. The first reading subunit is configured to read, under a condition that there is a page fault in accessing the target data, a first data block matching the set capacity unit from a disk. The first storage subunit is configured to store the first data block into the idle cache block. The first establishment subunit is configured to establish a mapping relationship between a physical address and a virtual address of the first data block. The releasing subunit is configured to release, under a condition that the idle linked list is empty, an available cache block from the cache linked list. The second reading subunit is configured to read, under a condition that there is the page fault in accessing the target data, a second data block matching the set capacity unit from the disk. The second storage subunit is configured to store the second data block to the available cache block. The second establishment subunit is configured to establish a mapping relationship between a physical address and a virtual address of the second data block, and until all the data blocks divided by the target data are stored in the target cache block, end the operation.

In some embodiments, from the release subunit, an available cache block is selected from the cache linked list according to a replacement algorithm of the cache linked list. And original data in the available cache block is written back to the disk.

In some embodiments, the recording unit is configured to record the file number of the target data, the length of the target data, an offset of the target data in the file, a source address for indicating the target cache block where the target data is located, a destination address of the accelerator card corresponding to the source address, and the state information for characterizing the data synchronization state of the target cache block and the accelerator card.

In some embodiments, the adjustment unit is configured to adjust, after the target data is transmitted to the accelerator card, the state information as an identifier for characterizing that both the accelerator card and the target cache block store data and the data is consistent.

In some embodiments, the adjustment unit is configured to modify, under a condition that receiving a target data modification instruction, the target data stored in the target cache block, and adjust the state information of the target cache block as an identifier for characterizing that both the accelerator card and the target cache block store data and the data is inconsistent.

In some embodiments, the apparatus further includes a locking unit. The locking unit is configured to perform memory locking on the cache blocks of the cache pool.

In some embodiments, the apparatus further includes a data cache determination unit, a loading unit, an add unit, a generation unit, and a transmission unit. The data cache determination unit is configured to determine, under a condition that receiving an acceleration processing instruction of first data, whether the first data is cached by the cache pool. The loading unit is configured to load, under a condition that the first data is not cached by the cache pool, the first data from a disk into the cache pool. The add unit is configured to add the first data in the cache pool to a DMA transmission linked list. The generation unit is configured to generate a DMA descriptor according to meta information corresponding to a cache block storing the first data. And the transmission unit is configured to transmit the DMA descriptor to the accelerator card, whereby the accelerator card acquires the first data contained in the DMA transmission linked list according to the DMA descriptor.

In some embodiments, the data cache determination unit includes a construction subunit, a division subunit, a first determination subunit, and a second determination subunit. The constructing subunit is configured to construct, under a condition that receiving the acceleration processing instruction of the first data, a file information linked list according to a file number and data volume of the first data. The division subunit is configured to divide the first data into file blocks according to a set capacity unit. The first determination subunit is configured to traverse a file block of the file information linked list, and determine whether the current file information linked list is empty. The second determination subunit is configured to determine, under a condition that the current file information linked list is not empty, whether the current file block is cached by the cache pool. Accordingly, the loading unit is configured to load, under a condition that the current file block is not cached by the cache pool, the current file block from the disk into the cache pool, add the current file block in the cache pool to the DMA transmission linked list. Until the current file information linked list is empty, the generation unit is configured to execute step of generating a DMA descriptor according to meta information corresponding to a cache block storing the first data.

In some embodiments, the apparatus further includes an identification determination unit and a skip unit. The identification determination unit is configured to determine, under a condition that the current file block is cached by the cache pool, whether state information corresponding to the current cache block caching the current file block is an identifier for characterizing that both the accelerator card and the current cache block store data and the data is consistent. The add unit is configured to add, under a condition that the state information corresponding to the current cache block is an identifier for characterizing that both the accelerator card and the current cache block store data and the data is inconsistent, the current file block in the cache pool to the DMA transmission linked list. And the skip unit is configured to skip the current file block under a condition that the state information corresponding to the current cache block is the identifier for characterizing that both the accelerator card and the current cache block store data and the data is consistent.

In some embodiments, the adjustment unit is further configured to adjust, after the transmitting the DMA descriptor to the accelerator card, whereby the accelerator card acquires the first data contained in the DMA transmission linked list according to the DMA descriptor, state information corresponding to the first data in the cache pool as an identifier for characterizing that both the accelerator card and the cache pool store data and the data is consistent. The write protection setting unit is further configured to set write protection for the cache block where the first data is located.

The description of the features in the embodiment corresponding to FIG. 16 may be made concerning the description of the embodiments corresponding to FIGS. 3, 7, and 11, and will not be repeated here.

It may be seen from the above technical solution that a cache pool matching the memory capacity of the accelerator card is created on the host side. The cache pool contains cache blocks divided according to a set capacity unit. The cache block may cache data, the cache block corresponds to the accelerator card, and the data of the cache block may be transmitted to the accelerator card. The capacity of the cache pool matches the memory capacity of the accelerator card, so a large amount of data may be cached. A capacity unit is set based on the transmission requirement of single data, which may effectively solve the problem of transmission bandwidth waste caused by an excessively small amount of single transmission data. Under a condition that acquiring a read instruction of the target data, a target cache block matching the capacity of the target data may be called from the cache pool, and the target data may be stored in the target cache block. Data of a cache pool may be transmitted to the accelerator card, and the host side may record meta information about the target cache block and set write protection for the target cache block. The meta information includes a file number to which the target data belongs, a length of the target data, address information about the target data, and state information for characterizing data synchronization state of the target cache block and the accelerator card. The state information about each cache block is adjusted according to an operation executed by data in each cache block. The state information includes an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent. In the technical solution, by creating the cache pool matching the memory capacity of the accelerator card on the host side, and dividing the cache pool into a plurality of cache blocks according to a set capacity unit, the cache blocks are continuous large block memory. The method requires few transmission descriptors and may continuously transmit a large amount of data at a time, thereby improving the bandwidth utilization and improving the efficiency of data transmission. The data read from the disk may be directly put into the cache pool, and the data in the cache pool may be directly transmitted to the accelerator card. For the host side, the target data is directly cached into a pre-allocated cache pool, without additional memory copy operation in response to a determination that transmitting to the accelerator card, which effectively reduces the transmission delay of the data. There is no repeated transmission for the content-consistent data cached in the accelerator card, which saves the transmission time and improves the execution efficiency. In addition, by setting write protection for a target cache block in which data is written, dynamic adjustment of state information may be realized in response to a determination that data in the target cache block changes, whereby the host side may learn whether data in the cache pool is synchronized with data in the accelerator card according to the state information, thereby avoiding repeated transmission of the same data.

Figure 17:
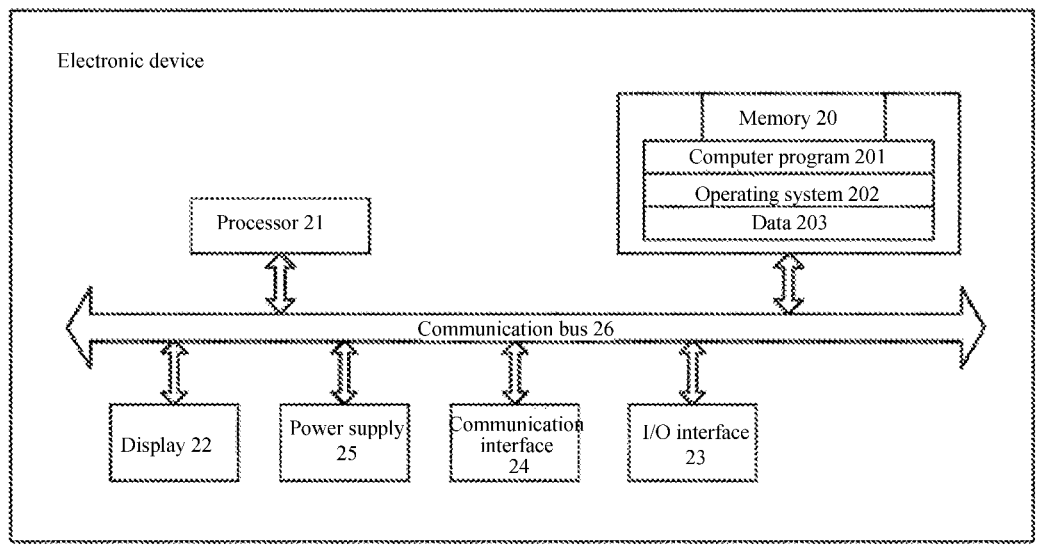
FIG. 17 is a structural diagram of an electronic device provided by an embodiment of the present application.

FIG. 17 is a structural diagram of an electronic device provided by an embodiment of the present application. As shown in FIG. 17, the electronic device includes a memory 20 configured to store computer programs. And a processor 21 configured to implement steps of the data access method according to the above embodiments when executing the computer programs.

The electronic device provided by the embodiment may include but is not limited to, a smartphone, a tablet, a notebook, or a desktop computer.

The processor 21 may include one or more processing cores, such as a 4-core processor or an 8-core processor. The processor 21 may be implemented in hardware in the form of at least one of digital signal processing (DSP), field-programmable gate array (FPGA), and programmable logic array (PLA). The processor 21 may further include a main processor and a co-processor. The main processor is a processor for processing data in a wake-up state and is also called a central processing unit (CPU). The coprocessor is a low-power processor for processing data in a standby state. In some embodiments, the processor 21 may be integrated with a graphics processing unit (GPU), the GPU configured to be responsible for rendering and drawing the content that a display needs to display. In some embodiments, processor 21 may further include an artificial intelligence (AI) processor, the AI processor configured to process computing operations related to machine learning.

The memory 20 may include one or more non-transitory readable storage media, and the non-transitory readable storage media may be non-transitory. The memory 20 may further include high-speed random-access memory (RAM) as well, as non-transitory memory, such as one or more magnetic disk storage devices and flash memory storage devices. In some embodiments of the present application, the memory 20 is at least configured to store a computer program 201. The computer program, after being loaded and executed by the processor 21, may implement the relevant steps of the data access method disclosed in any of the preceding embodiments. In addition, the resources stored in the memory 20 may further include an operating system 202 and data 203, and the storage mode may be transient storage or permanent storage. The operating system 202 may include Windows, Unix, Linux, and the like. Data 203 may include but is not limited to, meta information and the like.

In some embodiments, the electronic device may further include a display 22, an input/output (I/O) interface 23, a communication interface 24, a power supply 25, and a communication bus 26.

It will be understood by the skilled in the art that the structure shown in FIG. 17 is not to be construed as limiting the electronic device and may include more or fewer assemblies than those shown.

It will be appreciated that the data access method of the above embodiments if implemented in the form of a software function unit and sold or used as a stand-alone product, may be stored in a computer-readable storage medium. Based on such an understanding, the technical solution of the present application, either substantively or in any part contributing to the prior art, or all or part of the technical solution, may be embodied in the form of a software product. The computer software product is stored in a storage medium for executing all or part of the steps of the method of various embodiments of the present application. The storage medium includes a USB flash disk, a removable hard disk, a read-only memory (ROM), RAM, an electrically erasable programmable ROM (EEPROM), a register, a hard disk, a removable magnetic disk, a CD-ROM, a magnetic disk, or an optical disk, and various media which may store program codes.

Figure 18:
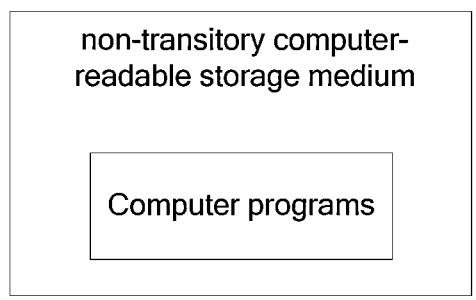
FIG. 18 is a structural diagram of a non-transitory readable storage medium provided by an embodiment of the present application.

Based on this, as shown in FIG. 18, embodiments of the present application further provide a non-transitory readable storage medium storing thereon computer programs that, when executed by a processor, implement steps of the data access method described above.

A data access method and apparatus, a device, and a non-transitory readable storage medium provided by the embodiments of the present application are described in detail above. Various embodiments are described in the specification in a progressive manner, with each embodiment focusing on differences from the other embodiments, and with reference to the same or similar parts of the various embodiments. The apparatus disclosed in the embodiments is relatively simple to describe since it corresponds to the method disclosed in the embodiments, as explained in the method section.

The skilled in the art may further be aware that the units and algorithmic steps of each example described in conjunction with the embodiments disclosed herein may be implemented in electronic hardware, computer software, or a combination of the two, and that the composition and steps of each example have been described generally by function in the above notes to clearly illustrate the interchangeability of hardware and software. Whether such functions are implemented as hardware or software depends upon the application and design constraints imposed on the technical solutions. The skilled in the art may implement the described functions in varying ways for each application, but such implementation should not be interpreted as causing a departure from the scope of the present application.

A data access method and apparatus, a device, and a non-transitory readable storage medium provided by the present application are described in detail above. In the specification, examples are applied to illustrate the principle and implementation of the present application. The above embodiments are used to help understand the method and core ideas of the present application. For the ordinarily skilled in the technical field, without deviating from the principle of the present application, several improvements and modifications may also be made to the present application, and these improvements and modifications also fall within the scope of protection of the claims of the present application.

The invention claimed is:

1. A data access method, comprising:
  creating a cache pool matching memory capacity of an accelerator card on a host side, the cache pool comprising cache blocks divided according to a set capacity unit;
  calling, under a condition that acquiring a read instruction of target data, a target cache block matching capacity of the target data from the cache pool, and storing the target data into the target cache block;
  recording meta information about the target cache block, and setting write protection for the target cache block, wherein the meta information comprises a file number to which the target data belongs, a length of the target data, address information about the target data, and state information for characterizing data synchronization state of the target cache block and the accelerator card; and
  executing a data access operation according to state information corresponding to the cache blocks, and adjusting the state information about the cache blocks after executing the data access operation, wherein the state information comprises an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

2. The data access method according to claim 1, wherein after the creating a cache pool matching memory capacity of an accelerator card on a host side, the method further comprises:
creating an idle linked list and a cache linked list, wherein the idle linked list is configured to store unused cache blocks, and the cache linked list is configured to store used cache blocks; and
the calling, under a condition that acquiring a read instruction of target data, a target cache block matching capacity of the target data from the cache pool, and storing the target data into the target cache block comprises:
selecting, under the condition that acquiring the read instruction of the target data, the target cache block matching the capacity of the target data from the idle linked list and the cache linked list, and storing the target data into the target cache block, wherein the target cache block is stored in the cache linked list.

3. The data access method according to claim 2, wherein the selecting the target cache block matching the capacity of the target data from the idle linked list and the cache linked list, and storing the target data into the target cache block comprises:
storing one idle cache block in the idle linked list into the cache linked list under a condition that the idle linked list is not empty;
reading, under a condition that there is a page fault in accessing the target data, a first data block matching a set capacity unit from a disk, and storing the first data block into the idle cache block; and
establishing a mapping relationship between a physical address and a virtual address of the first data block; or
releasing, under a condition that the idle linked list is empty, an available cache block from the cache linked list, and reading, under the condition that there is the page fault in accessing the target data, a second data block matching the set capacity unit from the disk, and storing the second data block to the available cache block;
establishing a mapping relationship between a physical address and a virtual address of the second data block; and
ending operation when all data blocks divided by the target data are stored in the target cache block.

4. The data access method according to claim 3, wherein the releasing an available cache block from the cache linked list comprises:
selecting the available cache block from the cache linked list according to a replacement algorithm of the cache linked list; and
writing original data in the available cache block back to the disk.

5. The data access method according to claim 1, wherein the recording meta information about the target cache block comprises:
recording the file number of the target data, the length of the target data, an offset of the target data in a file, a source address for indicating the target cache block where the target data is located, a destination address of an accelerator card corresponding to the source address, and the state information for characterizing the data synchronization state of the target cache block and the accelerator card.

6. The data access method according to claim 1, wherein the adjusting the state information about the cache blocks after executing the data access operation comprises:
adjusting, after the target data is transmitted to the accelerator card, the state information as an identifier for characterizing that both the accelerator card and the target cache block store data and the data is consistent.

7. The data access method according to claim 1, wherein the executing a data access operation according to state information corresponding to the cache blocks, and adjusting the state information about the cache blocks after executing the data access operation comprises:
modifying, under a condition that a target data modification instruction is received, the target data stored in the target cache block, and adjusting the state information as an identifier for characterizing that both the accelerator card and the target cache block store data and the data is inconsistent.

8. The data access method according to claim 1, wherein after the creating a cache pool matching memory capacity of an accelerator card on a host side, the method further comprises:
performing memory locking on the cache blocks of the cache pool.

9. The data access method according to claim 1, wherein after the creating a cache pool matching memory capacity of an accelerator card on a host side, the method further comprises:
determining, under a condition that an acceleration processing instruction of first data is received, whether the first data is cached by the cache pool;
loading, under a condition that the first data is not cached by the cache pool, the first data from a disk into the cache pool;
adding the first data in the cache pool to a direct memory access (DMA) transmission linked list;
generating a DMA descriptor according to meta information corresponding to a cache block storing the first data; and
transmitting the DMA descriptor to the accelerator card, whereby the accelerator card acquires the first data contained in the DMA transmission linked list according to the DMA descriptor.

10. The data access method according to claim 9, wherein the determining, under a condition that an acceleration processing instruction of first data is received, whether the first data is cached by the cache pool comprises:
constructing, under a condition that the acceleration processing instruction of the first data is received, a file information linked list according to a file number and data volume of the first data;
dividing the first data into file blocks according to the set capacity unit;
traversing the file blocks of the file information linked list, and determining whether a current file information linked list is empty;
determining, under a condition that the current file information linked list is not empty, whether a current file block is cached by the cache pool; and
the loading, under a condition that the first data is not cached by the cache pool, the first data from a disk into the cache pool; and the adding the first data in the cache pool to a DMA transmission linked list comprises:

loading, under a condition that the current file block is not cached by the cache pool, the current file block from the disk into the cache pool; adding the current file block in the cache pool to the DMA transmission linked list; and executing a step of the generating a DMA descriptor according to meta information corresponding to a cache block storing the first data, until the current file information linked list is empty.

11. The data access method according to claim 10, further comprising:

determining, under a condition that the current file block is cached by the cache pool, whether state information corresponding to the current cache block caching the current file block is an identifier for characterizing that both the accelerator card and the current cache block store data and the data is consistent;

adding, under a condition that the state information corresponding to the current cache block is the identifier for characterizing that both the accelerator card and the current cache block store data and the data is inconsistent, the current file block in the cache pool to the DMA transmission linked list; and skipping the current file block under a condition that the state information corresponding to the current cache block is the identifier for characterizing that both the accelerator card and the current cache block store data and the data is consistent.

12. The data access method according to claim 9, wherein after the transmitting the DMA descriptor to the accelerator card, whereby the accelerator card acquires the first data contained in the DMA transmission linked list according to the DMA descriptor, the method further comprises:

adjusting state information corresponding to the first data in the cache pool as an identifier for characterizing that both the accelerator card and the cache pool store data and the data is consistent; and setting write protection for the cache block where the first data is located.

13. The data access method according to claim 1, wherein the address information about the target data comprises at least an offset of the target data in a file, a source address of the target data in the cache pool, and a destination address of the accelerator card corresponding to the source address.

14. The data access method according to claim 1, further comprising:

reading, under a condition that the host side does not cache a preset data block, preset data from a disk into the cache blocks of the cache pool, transmitting data of the cache blocks to the accelerator card, and modifying the state information about the cache blocks to indicate that both the host side and the accelerator card cache data and the data is consistent.

15. The data access method according to claim 1, further comprising:

transmitting, under a condition that the host side caches a preset data block but the accelerator card does not cache the preset data block, preset data stored in the cache blocks to the accelerator card, and modifying the state information about the cache blocks to indicate that both the host side and the accelerator card cache data and the data is consistent.

16. The data access method according to claim 1, further comprising:

transmitting, under a condition that both the host side and the accelerator card cache a preset data block, but data of the preset data block of the host side is modified, data of the preset data block stored in the cache blocks to the accelerator card, and modifying the state information about the cache block to indicate that both the host side and the accelerator card cache data and the data is consistent.

17. The data access method according to claim 1, further comprising:

performing no transmission operation on the cache blocks in the cache pool under a condition that both the host side and the accelerator card cache data, and the data is consistent.

18. The data access method according to claim 1, wherein the cache blocks are divided to be different cache blocks according to different capacity units; or the cache blocks are divided to be cache blocks of a same size according to a same capacity unit.

19. An electronic device, comprising:

a memory, configured to store computer programs; and a processor, configured to execute the computer programs to implement steps of a data access method comprising:

creating a cache pool matching memory capacity of an accelerator card on a host side, the cache pool comprising cache blocks divided according to a set capacity unit;

calling, under a condition that acquiring a read instruction of target data, a target cache block matching capacity of the target data from the cache pool, and storing the target data into the target cache block;

recording meta information about the target cache block, and setting write protection for the target cache block, wherein the meta information comprises a file number to which the target data belongs, a length of the target data, address information about the target data, and state information for characterizing data synchronization state of the target cache block and the accelerator card; and executing a data access operation according to state information corresponding to the cache blocks, and adjusting the state information about the cache blocks after executing the data access operation, wherein state information comprises an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

20. A non-transitory readable storage medium, wherein the non-transitory readable storage medium stores thereon computer programs that, when executed by a processor, implement steps of a data access method comprising:

creating a cache pool matching memory capacity of an accelerator card on a host side, the cache pool comprising cache blocks divided according to a set capacity unit;

calling, under a condition that acquiring a read instruction of target data, a target cache block matching capacity of the target data from the cache pool, and storing the target data into the target cache block;

recording meta information about the target cache block, and setting write protection for the target cache block, wherein the meta information comprises a file number to which the target data belongs, a length of the target data, address information about the target data, and state information for characterizing data synchronization state of the target cache block and the accelerator card; and executing a data access operation according to state information corresponding to the cache blocks, and adjusting state information about the cache blocks after executing the data access operation, wherein state information comprises an identifier for characterizing that the cache blocks do not cache data, an identifier for characterizing that the cache blocks cache data, an identifier for characterizing that both the cache blocks and the accelerator card store data and the data is consistent, and an identifier for characterizing that both the cache blocks and the accelerator card store data and the data is inconsistent.

* * * * *